(12) United States Patent
Sasaki et al.

(10) Patent No.: US 8,824,102 B2
(45) Date of Patent: Sep. 2, 2014

(54) THIN-FILM MAGNETIC HEAD WITH IMPROVED WIDE AREA TRACK ERASURE (WATE), METHOD OF MANUFACTURING THE SAME, HEAD GIMBAL ASSEMBLY, AND HARD DISK DRIVE

(75) Inventors: Yoshitaka Sasaki, Milpitas, CA (US); Hiroyuki Ito, Milpitas, CA (US); Shigeki Tanemura, Milpitas, CA (US); Kazuki Sato, Milpitas, CA (US); Atsushi Iijima, Hong Kong (CN)

(73) Assignees: Headway Technologies, Inc., Milpitas, CA (US); Sae Magntics (H.K.) Ltd., Hong Kong (CN)

( * ) Notice: Subject to any disclaimer, the term of this patent is extended or adjusted under 35 U.S.C. 154(b) by 151 days.

(21) Appl. No.: 13/099,729

(22) Filed: May 3, 2011

(65) Prior Publication Data

US 2012/0282492 A1    Nov. 8, 2012

(51) Int. Cl.
*G11B 5/31* (2006.01)
*G11B 5/127* (2006.01)

(52) U.S. Cl.
CPC ............ *G11B 5/1278* (2013.01); *G11B 5/3116* (2013.01)
USPC .............. 360/125.24; 360/125.25; 360/125.3; 360/123.05

(58) Field of Classification Search
CPC ....... G11B 5/1278; G11B 5/3116; G11B 5/17
USPC ............ 360/125.22, 125.23, 125.24, 125.25, 360/125.26, 125.43, 125.44, 125.45, 125.5, 360/125.3
See application file for complete search history.

(56) References Cited

U.S. PATENT DOCUMENTS

| | | | | |
|---|---|---|---|---|
| 6,724,572 | B1 * | 4/2004 | Stoev et al. | 360/125.43 |
| 2005/0128637 | A1 * | 6/2005 | Johnston et al. | 360/125 |
| 2005/0254169 | A1 * | 11/2005 | Guan et al. | 360/125 |
| 2006/0082924 | A1 * | 4/2006 | Etoh et al. | 360/125 |
| 2006/0087765 | A1 * | 4/2006 | Iwakura et al. | 360/125 |
| 2009/0141406 | A1 * | 6/2009 | Sasaki et al. | 360/319 |
| 2009/0279207 | A1 * | 11/2009 | Sasaki et al. | 360/125.3 |
| 2009/0296275 | A1 * | 12/2009 | Sasaki et al. | 360/125.3 |
| 2010/0165517 | A1 * | 7/2010 | Araki et al. | 360/319 |

FOREIGN PATENT DOCUMENTS

| | | |
|---|---|---|
| JP | A-2004-171762 | 6/2004 |
| JP | A-2006-323932 | 11/2006 |
| JP | A-2007-012108 | 1/2007 |
| JP | A-2009-252343 | 10/2009 |
| JP | A-2010-282717 | 12/2010 |

* cited by examiner

*Primary Examiner* — Craig A. Renner
(74) *Attorney, Agent, or Firm* — Oliff PLC

(57) ABSTRACT

A thin-film magnetic head includes a main magnetic pole layer, write shield layer, gap layer, and thin-film coils, which are laminated on a substrate. A return magnetic pole layer is spaced from the medium-opposing surface on the side opposite to the write shield layer with the main magnetic pole layer intervening therebetween. A connecting magnetic layer is formed using a magnetic material to connect the return magnetic pole layer to the write shield layer on the side closer to the medium-opposing surface than is the thin-film coil. The thin-film coil is wound as a flat spiral around the write shield layer. A part of the thin-film coil wound as the flat spiral is disposed only at a position distanced from the substrate than is the main magnetic pole layer.

12 Claims, 26 Drawing Sheets

(a)        (b)

(a)　　　　　(b)

THIN-FILM MAGNETIC HEAD WITH IMPROVED WIDE AREA TRACK ERASURE (WATE), METHOD OF MANUFACTURING THE SAME, HEAD GIMBAL ASSEMBLY, AND HARD DISK DRIVE

BACKGROUND

1. Field of the Invention

The present invention relates to a thin-film magnetic head which performs a magnetic recording action by a perpendicular magnetic recording scheme, a method of manufacturing the same, a head gimbal assembly, and a hard disk drive.

2. Related Background Art

A hard disk drive has a large recording capacity and is used as the heart of a storage device. The hard disk drive records and reproduces data to/from a hard disk (recording medium) by a thin-film magnetic head.

The thin-film magnetic heads can roughly be classified according to their recording schemes into those of longitudinal magnetic recording type and those of perpendicular magnetic recording type. The longitudinal magnetic recording scheme records data in a (longitudinal) direction within a recording surface of a hard disk (recording medium), while the perpendicular magnetic recording scheme records data such that the direction of recording magnetization formed in the hard disk is made perpendicular to the recording surface. The thin-film magnetic heads of perpendicular magnetic recording type have been considered more promising than those of longitudinal magnetic recording type, since they can realize a much higher recording density than that in the longitudinal magnetic recording scheme, while their recorded hard disks are less susceptible to heat fluctuation.

Meanwhile, a conventional magnetic head of perpendicular magnetic recording type (perpendicular magnetic recording head which will also be referred to as "PMR" in the following) has a magnetic pole layer and a thin-film coil. The PMR has a structure of electromagnet which the thin-film coil are wound around the magnetic pole layer.

A conventional PMR includes a main magnetic pole layer having a magnetic pole end face on a side of a medium-opposing surface opposing a recording medium, a thin-film coil which generates a magnetic field pass through inside of the main magnetic pole layer, and a return magnetic pole layer linked to the main magnetic pole layer via linking part.

Incidentally, the conventional PMR has problems called adjacent track erasure (ATE) and wide area track erasure (WATE). The PMR tilts with respect to the tangent of the track according to the position in the radius direction of the recording medium. This tilt is called skew. When the skew occurs, data recorded on the track adjacent to the track where data will be recorded is sometimes erased by the magnetic flux caused by the recording magnetic field, and this phenomenon is called adjacent track erasure (ATE).

Further, a phenomenon that data recorded on the track disposed at a position distanced by about several μm to several tens of μm from the track where data will be written is erased is WATE. WATE is caused by the fact that a part of the magnetic flux emitted from the main magnetic pole layer and then flowing back to the return magnetic pole layer passes through the shield layer formed in the reproducing head and is emitted from the medium-opposing surface.

A conventionally known technique of improving ATE is, for example, that the shape on the medium opposing surface side of the main magnetic pole layer is formed in a reverse-tapered shape having an upper width larger than a lower width to prevent occurrence of ATE (see, for example, JP 2004-171762 (referred to also as Patent Document 1)).

A known technique of improving WATE is that a backing coil is provided in addition to the thin-film coil which generates the recording magnetic field (see, for example, JP 2006-323932 (referred to also as Patent Document 2), JP 2007-12108 (referred to also as Patent Document 3), JP 2009-252343 (referred to also as Patent Document 4), JP 2010-282717 (referred to also as Patent Document 5)). In the PMR provided with the backing coil, a magnetic flux weakening the magnetic function of the magnetic flux passing through the shield layer is generated by the current flowing through the backing coil. The generation of the magnetic flux improves WATE.

As the PMR provided with the backing coil, there is a conventional PMR 600 illustrated in FIG. 26 for instance. The PMR 600 includes a main magnetic pole layer 601 generating a recording magnetic field, a yoke layer 602 joined to the main magnetic pole layer 601, a first write shield layer 604 joined to the main magnetic pole layer 601 in a medium-opposing surface (hereinafter, referred also to as "ABS") 603, a second write shield layer 605 joined to the first write shield layer 604 in the ABS 603, a thin-film coil 606 wound around the second write shield layer 605, a shield magnetic pole layer 608 joined to the main magnetic pole layer 601 via a back gap linking part 607, and a backing coil 609 wound around the back gap linking part 607.

SUMMARY OF THE INVENTION

In the above-described conventional PMR 600, the first write shield layer 604 is disposed near the main magnetic pole layer 601 in the ABS 603. Therefore, the magnetic flux emitted from the main magnetic pole layer 601 magnetizes the recording medium and is then taken into the first write shield layer 604. The magnetic flux flows from the first write shield layer 604 to the second write shield layer 605, and a part of the magnetic flux passes through the back gap linking part 607 and becomes a magnetic flux h605 and passes through the shield magnetic pole layer 608 toward the ABS 603. In the PMR 600, a magnetic flux h609 capable of weakening the magnetic function of the magnetic flux h605 is generated by the current flowing through the backing coil 609 to thereby achieve the effect of improving WATE.

However, the PMR 600 has the following problem caused by the backing coil 609.

Generally, regarding the magnetic flux, it is known that the law of conservation of magnetic flux is established. More specifically, it is known that lines of the magnetic flux indicating the magnetic flux density form continuous circles without break or growing at middle parts. Thus, inside the shield magnetic pole layer 608, the magnetic function of the magnetic flux h605 and the magnetic function of the magnetic flux h609 cancel each other out, and the magnetic flux h609 does not disappear thereafter but travels toward the main magnetic pole layer 601 and passes through the main magnetic pole layer 601 toward the ABS 603. Therefore, in addition to the magnetic flux caused by the thin-film coil 606, the magnetic flux h609 possibly passes through the main magnetic pole layer 601 and is emitted to the ABS 603, which can affect the recording medium.

Further, since the PMR 600 has the backing coil 609, a step for forming the backing coil 609 is required, thus bringing about difficulty in simplifying the manufacturing process.

Furthermore, since the backing coil 609 generates heat by the current flowing through the backing coil 609, members located around the backing coil 609 can expand. When the members located around the backing coil 609 expand, a part of the ABS 603 can project. Thus, the PMR 600 comes into contact with the recording medium and becomes likely to be damaged.

As described above, the conventional PMR achieving the effect of improving WATE by including the backing coil like the PMR 600 has the above-described unsolved problem.

The present invention is made to solve the above problem, and it is an object to make it possible to increase the effect of improving WATE without a backing coil in a thin-film magnetic head performing magnetic recording operation in the vertical magnetic recording system and a method of manufacturing the same and a head gimbal assembly and a hard disk drive.

To solve the above problem, the present invention is a thin-film magnetic head constructed such that a main magnetic pole layer having a magnetic pole end face on a side of a medium-opposing surface opposing a recording medium, a write shield layer having a write shield end face disposed in the medium-opposing surface, a gap layer formed between the main magnetic pole layer and write shield layer, and a thin-film coil are laminated on a substrate; the thin-film magnetic head including: a return magnetic pole layer formed at a position distanced from the medium-opposing surface on the side opposite to the write shield layer with the main magnetic pole layer intervening therebetween; and a connecting magnetic layer formed using a magnetic material so as to connect the return magnetic pole layer to the write shield layer on the side closer to the medium-opposing surface than is the thin-film coil, the thin-film coil is wound as a flat spiral around the write shield layer and has a single-layer structure that a part wound as the flat spiral is formed only at a position distanced from the substrate than is the main magnetic pole layer.

In the case of this thin-film magnetic head, the connecting magnetic layer is provided, so that the magnetic flux emitted from the main magnetic pole layer and traveling in a direction different from a direction perpendicular to the recording medium is divided and taken into the write shield layer and the connecting magnetic layer. Therefore, even if the thin-film coil has a single-layer structure, the magnetic function of the magnetic flux passing through the return magnetic pole layer toward the medium-opposing surface is weakened by the magnetic flux taken into the connecting magnetic layer.

In the case of the above-described thin-film magnetic head, it is preferable that the connecting magnetic layer has a front end shield part having a shield end face connected to the write shield end face in the medium-opposing surface, and the write shield end face and the shield end face surround the entire magnetic pole end face and are disposed near the magnetic pole end face.

In the above-described thin-film magnetic head, the magnetic flux in a direction different from a direction perpendicular to the recording medium is emitted from the magnetic pole end face, after that, the magnetic flux is likely to pass through the write shield end face or the shield end face before it affects the recording medium.

Further, in the case of the thin-film magnetic head, it is preferable that the thin-film magnetic head further includes a linking magnetic layer linking together the return magnetic pole layer and the main magnetic pole layer at a position distant from the medium-opposing surface, a magnetic circuit extending from the connecting magnetic layer and reaching the main magnetic pole layer through the return magnetic pole layer and the linking magnetic layer and having no coil wound therein is formed.

In this thin-film magnetic head, the magnetic flux taken into the connecting magnetic layer is likely to return to the main magnetic pole layer through the return magnetic pole layer and the linking magnetic layer.

Further, in the case of the thin-film magnetic head, it is preferable that the connecting magnetic layer includes a receding connecting part disposed at a position distanced from the medium-opposing surface and connected to an upper face on the main magnetic pole layer side of the return magnetic pole layer, and a middle connecting part connecting the front end shield part and the receding connecting part.

Further, it is preferable that the middle connecting part has a middle shield end face connected to the shield end face in the medium-opposing surface and is connected to an upper face on the main magnetic pole layer side of the receding connecting part.

Further, it is preferable that the middle connecting part has a depth extending from the medium-opposing surface and reaching a rear end part most distanced from the medium-opposing surface of the receding connecting part.

Further, in the case of the above-described thin-film magnetic head, it is possible that thin-film magnetic head further includes an opposing insulating layer arranged on the medium-opposing surface side of the receding connecting part.

Further, in the case of the above-described thin-film magnetic head, it is preferable that the front end shield part has a v-groove part formed in a v-shape in cross section in the direction along the medium-opposing surface, and the thin-film magnetic head further includes a nonmagnetic thin-film formed on an inner face inside the v-groove part, and the main magnetic pole layer is formed on the nonmagnetic thin-film.

Further, the present invention provides a method of manufacturing a thin-film magnetic head constructed such that a main magnetic pole layer having a magnetic pole end face on a side of a medium-opposing surface opposing a recording medium, a write shield layer having a write shield end face disposed in the medium-opposing surface, a gap layer formed between the main magnetic pole layer and write shield layer, and a thin-film coil are laminated on a substrate; the method including the following steps (1) to (5):

(1) a return magnetic pole layer forming step of forming a return magnetic pole layer so as to be arranged at a position distanced from the medium-opposing surface;

(2) a magnetic layer forming step of forming a connecting magnetic layer and a linking magnetic layer which are connected respectively to the return magnetic pole layer such that the connecting magnetic layer is disposed closer to the medium-opposing surface than is the linking magnetic layer and the connecting magnetic layer has a shield end face disposed in the medium-opposing surface;

(3) a main magnetic pole layer forming step of forming a main magnetic pole layer on the connecting magnetic layer and linking magnetic pole layer;

(4) a thin-film coil forming step of forming the thin-film coil wound as a flat spiral around the write shield layer and having a single-layer structure that a part wound as the flat spiral is formed only at a position distanced from the substrate than is the main magnetic pole layer; and (5) a write shield layer forming step of forming the write shield layer so as to have a write shield end face connected to the shield end face in the medium-opposing surface.

In the case of the above-described method of manufacturing, it is preferable that the magnetic layer forming step is performed in a manner that the connecting magnetic layer is disposed closer to the medium-opposing surface than is the thin-film coil.

Further, in the case of the above-described method of manufacturing, it is preferable that in the magnetic layer forming step, the connecting magnetic layer is formed by forming a receding connecting part disposed at a position distanced from the medium-opposing surface and connected to an upper face on the main magnetic pole layer side of the return magnetic pole layer, a front end shield part having the shield end face, and a middle connecting part connecting the front end shield part and the receding connecting part, in an order of the receding connecting part, the middle connecting part and the front end shield part.

Further, it is preferable that the magnetic layer forming step is performed in a manner to form a magnetic circuit extending from the connecting magnetic layer and reaching the main magnetic pole layer through the return magnetic pole layer and the linking magnetic layer without straddling the coil.

Further, it is preferable that in the magnetic layer forming step, the middle connecting part is formed to have a depth extending from the medium-opposing surface and reaching a rear end part most distanced from the medium-opposing surface.

Further, the present invention provides a head gimbal assembly including a thin-film magnetic head formed on a support and a gimbal for securing the support; the thin-film magnetic head is constructed such that a main magnetic pole layer having a magnetic pole end face on a side of a medium-opposing surface opposing a recording medium, a write shield layer having a write shield end face disposed in the medium-opposing surface, a gap layer formed between the main magnetic pole layer and write shield layer, and a thin-film coil are laminated on a substrate; the thin-film magnetic head including: a return magnetic pole layer formed at a position distanced from the medium-opposing surface on the side opposite to the write shield layer with the main magnetic pole layer intervening therebetween; and a connecting magnetic layer formed using a magnetic material so as to connect the return magnetic pole layer to the write shield layer on the side closer to the medium-opposing surface than is the thin-film coil, the thin-film coil is wound as a flat spiral around the write shield layer and has a single-layer structure that a part thereof wound as the flat spiral is formed only at a position distanced from the substrate than is the main magnetic pole layer.

Further, the present invention provides a hard disk drive including a head gimbal assembly having a thin-film magnetic head and a recording medium opposing the thin-film magnetic head; the thin-film magnetic head is constructed such that a main magnetic pole layer having a magnetic pole end face on a side of a medium-opposing surface opposing a recording medium, a write shield layer having a write shield end face disposed in the medium-opposing surface, a gap layer formed between the main magnetic pole layer and write shield layer, and a thin-film coil are laminated on a substrate; the thin-film magnetic head including: a return magnetic pole layer formed at a position distanced from the medium-opposing surface on the side opposite to the write shield layer with the main magnetic pole layer intervening therebetween; and a connecting magnetic layer formed using a magnetic material so as to connect the return magnetic pole layer to the write shield layer on the side closer to the medium-opposing surface than is the thin-film coil, the thin-film coil is wound as a flat spiral around the write shield layer and has a single-layer structure that a part thereof wound as the flat spiral is formed only at a position distanced from the substrate than is the main magnetic pole layer.

The present invention will be more fully understood from the detailed description given hereinbelow and the accompanying drawings which are given by way of illustration only, and thus are not to be considered as limiting the present invention.

DETAILED DESCRIPTION OF THE EMBODIMENTS

In the following, embodiments of the present invention will be described with reference to the drawings. Note that the same components will be referred to with the same numerals or letters, while omitting their overlapping descriptions.

First Embodiment (Structures of Thin-Film Magnetic Head)

Figure 1:
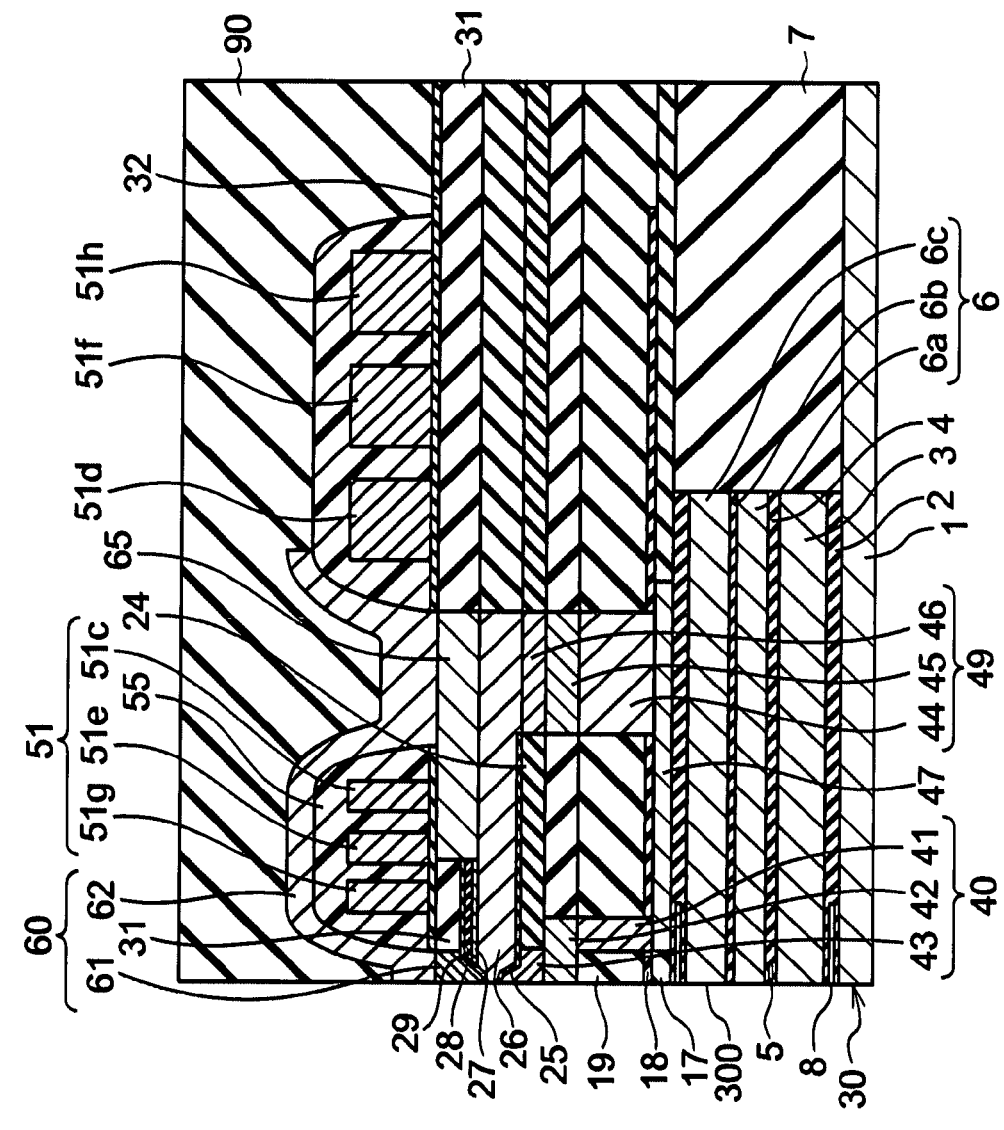
FIG. 1 is a sectional view of the thin-film magnetic head according to a first embodiment of the present invention taken along the line 1-1 of FIG. 2, along by a direction intersecting its air bearing surface.
Figure 2:
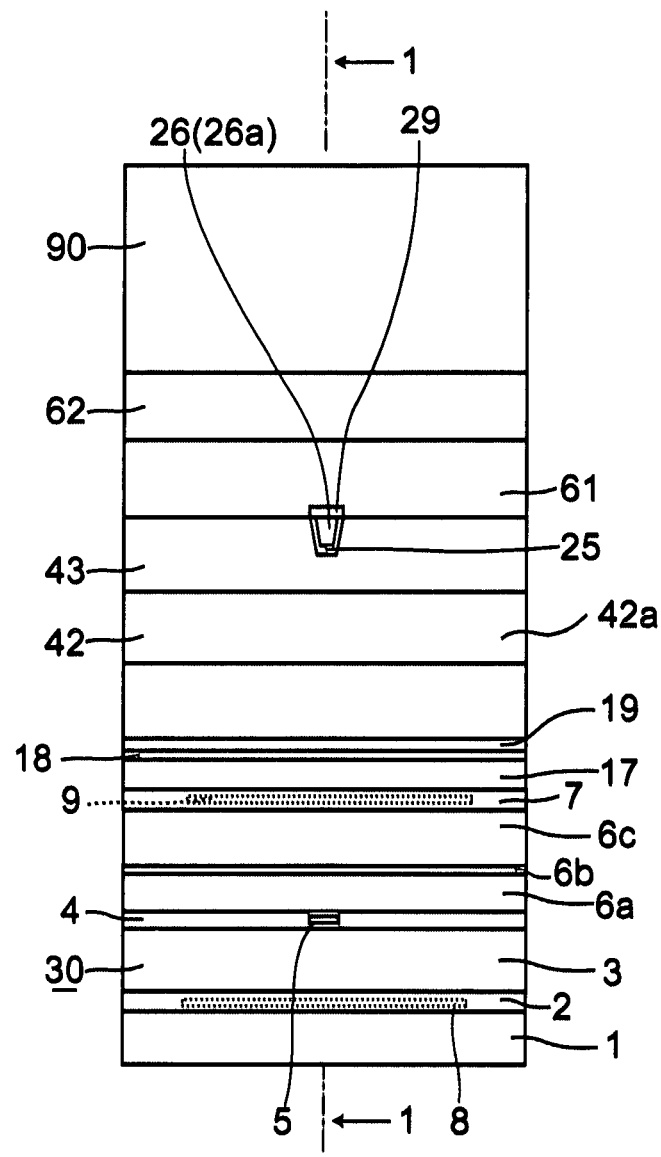
FIG. 2 is a front view illustrating an ABS of the thin-film magnetic head.
Figure 3:
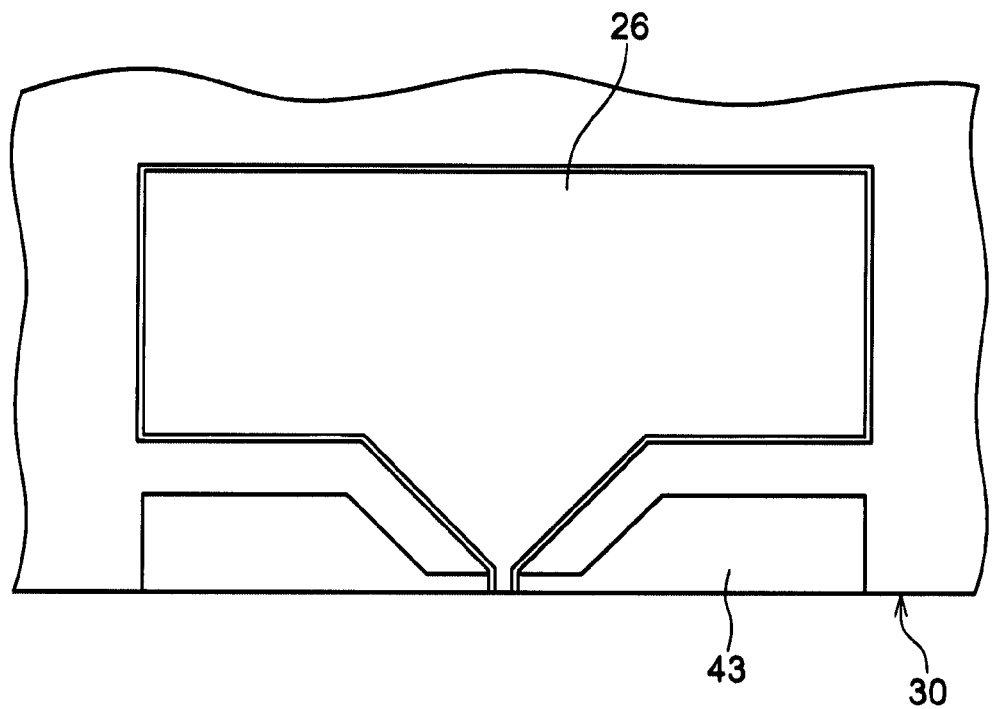
FIG. 3 is a plan view illustrating a main magnetic pole layer and a front end shield part.
Figure 4:
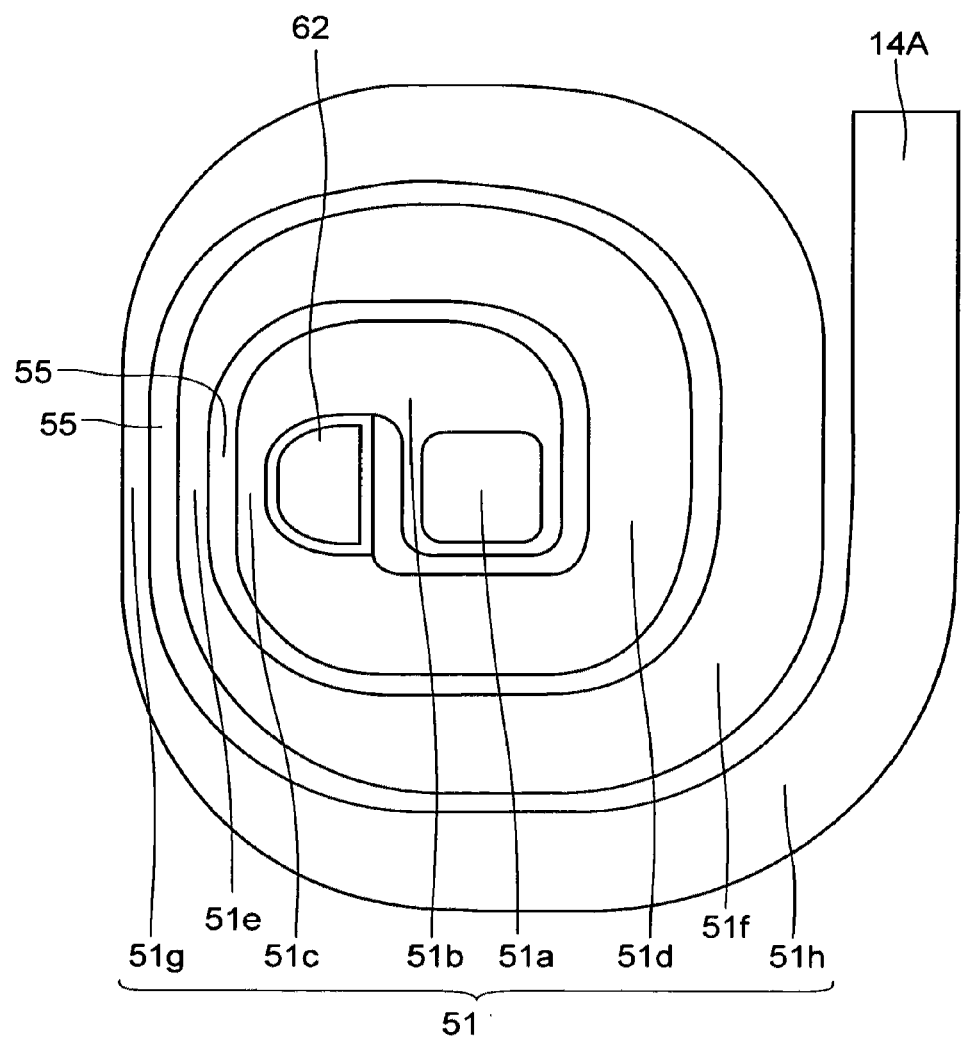
FIG. 4 is a plan view illustrating a thin-film coil.
Figure 5:
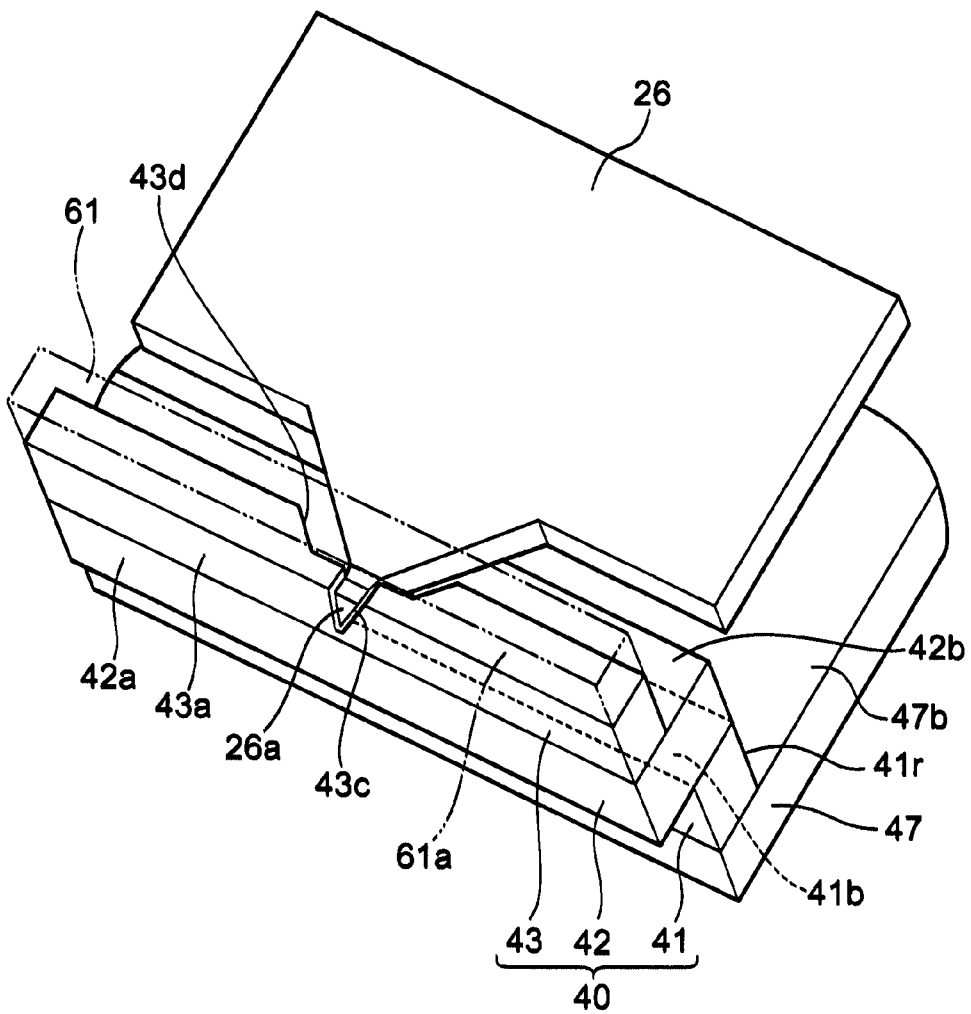
FIG. 5 is a perspective view illustrating the main magnetic pole layer, a connecting magnetic layer and a return magnetic pole layer, with a part thereof omitted.
Figure 6:
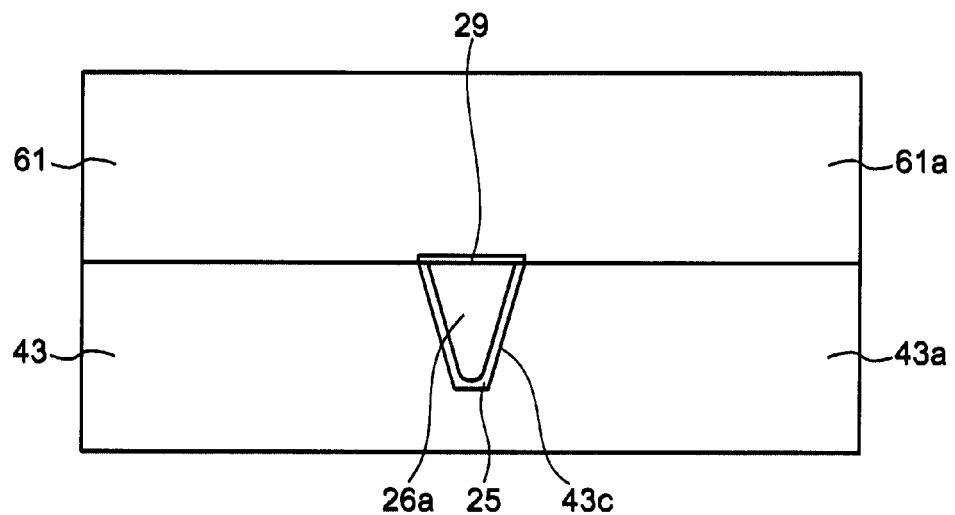
FIG. 6 is a front view illustrating principal parts of the front end shield part and an opposing shield part.
Figure 7:
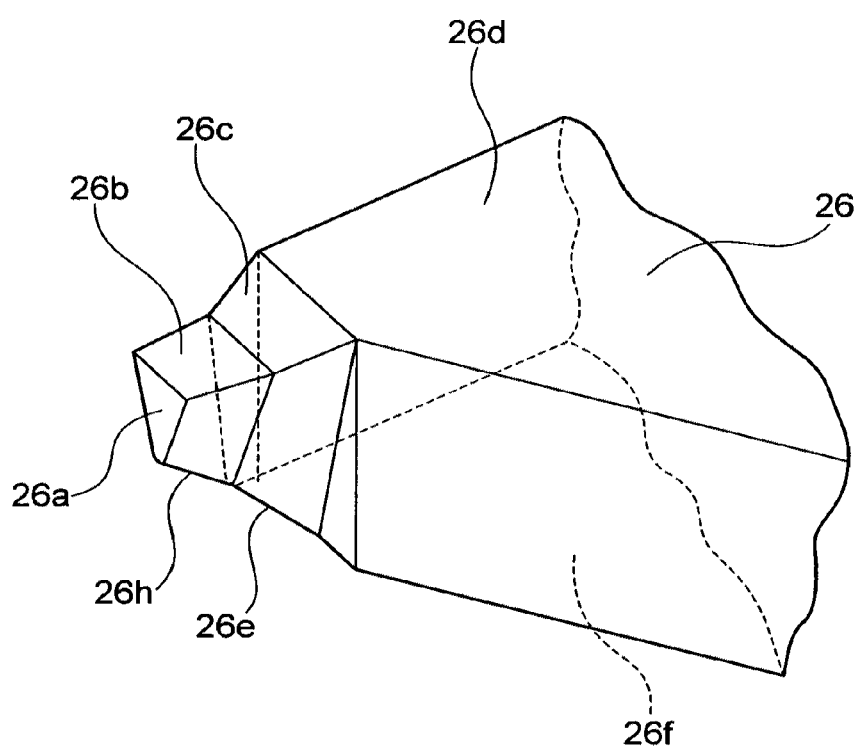
FIG. 7 is a perspective view illustrating a neighborhood of the ABS in the main magnetic pole layer, with a part thereof omitted.
Figure 8:
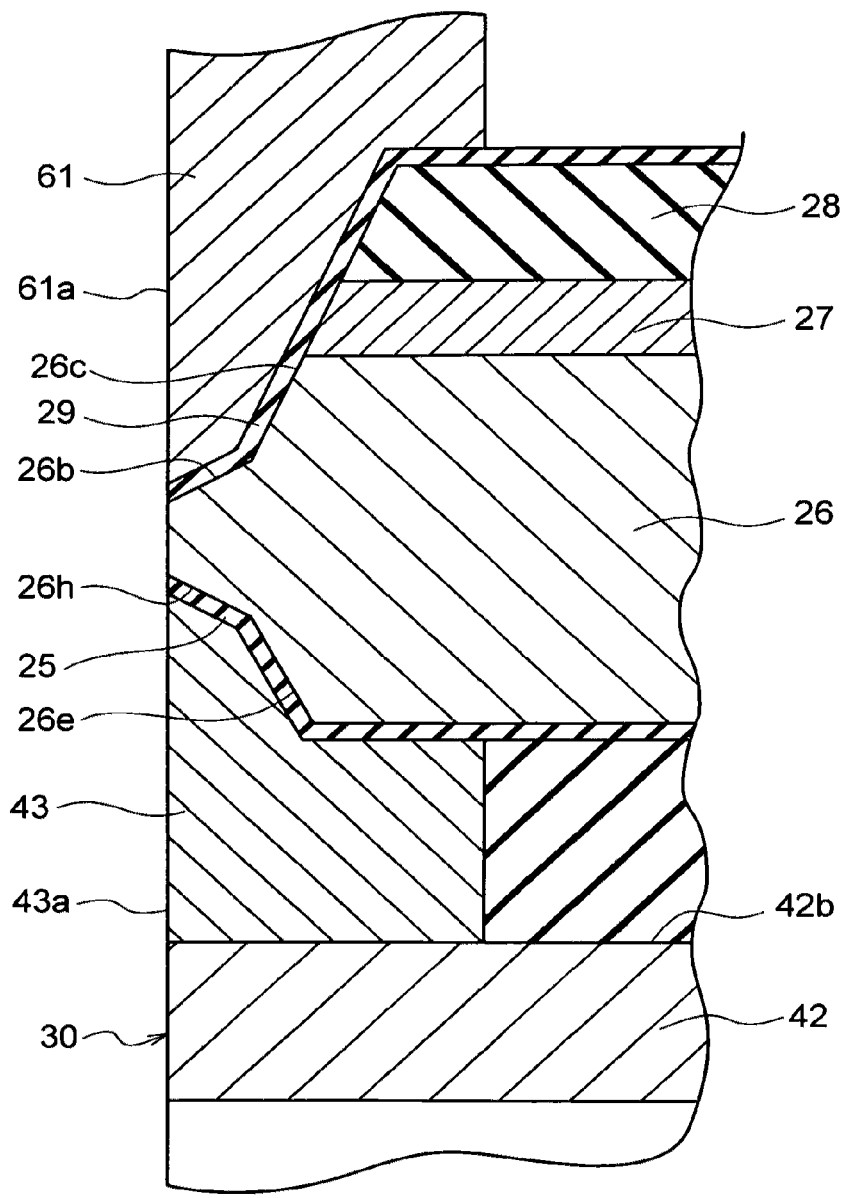
FIG. 8 is a sectional view illustrating a principal part of FIG. 1.

To begin with, the structure of a thin-film magnetic head of perpendicular magnetic recording type according to the first embodiment of the present invention will be explained with reference to FIG. 1 to FIG. 8. Here, FIG. 1 is a sectional view of the thin-film magnetic head 300 according to a first embodiment of the present invention taken along the line 1-1 of FIG. 2, along by a direction intersecting its air bearing surface (which will hereinafter be referred to as "ABS"), FIG. 2 is a front view illustrating the ABS 30 of the thin-film magnetic head 300. FIG. 3 is a plan view illustrating a main magnetic pole layer 26 and a front end shield part 43. FIG. 4 is a plan view illustrating a thin-film coil 51. FIG. 5 is a perspective view illustrating the main magnetic pole layer 26, a connecting magnetic layer 40 and a return magnetic pole layer 47, with a part thereof omitted. FIG. 6 is a front view illustrating principal parts of the front-end shield part 43 and an opposing shield part 61. FIG. 7 is a perspective view illustrating a neighborhood of the ABS in the main magnetic pole layer 26, with a part thereof omitted, FIG. 8 is a sectional view illustrating a principal part of FIG. 1.

The thin-film magnetic head 300 comprises a substrate 1 and reproducing and recording heads laminated on the substrate 1, while having the ABS 30 as a medium-opposing surface opposing a recording medium. The following will explain structures of main parts of the thin-film magnetic head 300, while structures of parts other than the main parts will later be explained in manufacturing steps.

The reproducing head has an MR device 5, arranged near the ABS 30, for detecting a magnetic signal. The reproducing head has an insulating layer 2 formed on the substrate 1, a lower shield layer 3 made of a magnetic material, and a shield gap film 4 shielding the MR device 5. The reproducing head further has an upper shield layer 6 made of a magnetic material formed on the shield gap film 4, and an insulating layer 7 formed on the upper shield layer 6. The reproducing head is arranged in a position closer to the substrate 1 than the recording head.

The MR device 5 is constituted by a magnetosensitive film exhibiting a magnetoresistive effect, such as AMR (anisotropic magnetoresistive), GMR (giant magnetoresistive), and TMR (tunneling magnetoresistive) devices.

The upper shield layer 6 has an insulating part 6b in the middle thereof. Further, a first shield part 6a is formed on the lower side of the insulating part 6b and a second shield part 6c is formed on the upper side of the insulating part 6b.

In the thin-film magnetic head 300, a heating part 8 is formed in the insulating layer 2. The heating part 8 is also called a DFH (Disk flying heater) and has a function of generating heat by electric current flowing therethrough and conducting the heat to the upper shield layer 6 and the like.

Further, a heat sensing part 9 is formed in the insulating layer 7. The heat sensing part 9 is also called an HDI (Head Disk Interlayer) sensor. The heat sensing part 9 is formed using an element which senses heat (temperature) near the upper shield layer 6 and changes in resistance value according to the sensed heat.

Further, in the thin-film magnetic head 300, the heating part 8 heats the upper shield layer 6 and the lower shield layer 3. The upper shield layer 6 and the lower shield layer 3 expand in volume by the heat received from the heating part 8. As a result, assuming that the upper shield layer 6 and the lower shield layer 3 come into contact with a recording medium not illustrated in FIG. 1, parts of the upper shield layer 6 and the lower shield layer 3 near the ABS 30 become heated due to friction.

In the thin-film magnetic head 300, a judgment whether or not the upper shield layer 6 and the lower shield layer 3 have come into contact with the recording medium is made by detecting the change in resistance value of the heat sensing part 9 caused by the friction heat. Further, the frying height is controlled while controlling the current value flowing through the heating part 8 according to the judgment result. A height for flying the slider from the recording medium is the frying height.

The recording head has the main magnetic pole layer 26, a gap layer 29, a connecting magnetic layer 40, a return magnetic pole layer 47, a linking magnetic layer 49, a thin-film coil 51, a write shield layer 60, an upper yoke layer 65 and protective insulating layer 90, which are laminated on the substrate 1.

The main magnetic pole layer 26 is formed using a magnetic material made of a ferromagnetic body such as NiFe, CoNiFe, CoFe or the like. The ferromagnetic body such as NiFe, CoNiFe, CoFe or the like has a high magnetic permeability. Therefore, a magnetic flux is likely to transmit through the main magnetic pole layer 26, much more magnetic flux transmit through the main magnetic pole layer 26. For this reason, more strong magnetic flux corresponding to the recording magnetic field is emitted from the main magnetic pole layer 26 to the ABS 30.

The main magnetic pole layer 26 has a magnetic pole end face 26a on the ABS 30 side, as illustrated in FIG. 2, FIG. 5, FIG. 7. The magnetic pole end face 26a has a bevel form which is wider on the thin-film coil 51 side than on the substrate 1 side and gradually decreases its width toward the substrate 1. The width of the magnetic pole end face 26a on the thin-film coil 51 side defines the track width. The track width is about 0.06 to 0.12 μm, for example. The magnetic pole end face 26a is positioned on the ABS 30.

The main magnetic pole layer 26 includes a track width determining part having the magnetic pole end face 26a, a wider part and a width extending part. The track width determining part has a fixed width regardless of the distance from the ABS 30. The wider part is arranged at a position distanced more from the ABS 30 than is the track width determining part and has a width greater than that of the track width determining part. The wider part has the same width as that of the track width determining part at the boundary with the track width determining part, gradually increases the width as it is distanced more from the ABS 30. The width extending part has a fixed width greater than the wider part. In this embodiment, a part extending from the magnetic pole end part 26a until the width begins to increase is defined as the track width determining part.

Further, as illustrated in FIG. 7, FIG. 8, in the main magnetic pole layer 26, a first upper tilted surface 26b and a second upper tilted surface 26c and a first lower tilted surface 26h and a second lower tilted surface 26e are formed in the track width determining part.

Each of the first upper tilted surface 26b and the second upper tilted surface 26c is formed in an ascending slope like shape distanced more from the substrate 1 as it is distanced more from the ABS 30. However, the tilt angle of the second upper tilted surface 26c is larger than the tilt angle of the first upper tilted surface 26b as seen from the direction intersecting the ABS 30. Therefore, the upper face of the track width determining part is formed in a two-stage tilt structure. The first upper tilted surface 26b is connected to the magnetic pole end face 26a and the second upper tilted surface 26c. The second upper tilted surface 26c is connected to the first upper tilted surface 26b and an upper face 26d of the wider part.

Each of the first lower tilted surface 26h and the second lower tilted surface 26e is formed in a descending slope like shape closer to the substrate 1 as it is distanced more from the ABS 30. However, the tilt angle of the second lower tilted surface 26e is larger than the tilt angle of the first lower tilted surface 26h as seen from the direction intersecting the ABS 30. Therefore, the lower end face of the track width determining part is also formed in a two-stage tilt structure. The first lower tilted surface 26h is connected to the magnetic pole end face 26a and the second lower tilted surface 26e. The second lower tilted surface 26e is connected to the first lower tilted surface 26h and a lower face 26f of the wider part. 100521 In the main magnetic pole layer 26, nonmagnetic layers 27, 28 are laminated on a part of the upper face 26d between an opposing shield part 61 and the upper yoke layer 65 which will be explained later.

The length of the track width determining part from the ABS 30 is referred to as neck height. The neck height is about 0.05 to 0.3 μm, for example.

The gap layer 29 is formed along the first upper tilted surface 26b, the second upper tilted surface 26c and the upper face 26d of the main magnetic pole layer 26 between the opposing shield part 61, the insulating layer 31 and the main magnetic pole layer 26, the nonmagnetic layers 27, 28. The gap layer 29 is formed so as to cover the first upper tilted surface 26b, the second upper tilted surface 26c and the upper face 26d. The gap layer 29 is made of an insulating material such as alumina ($Al_2O_3$), nonmagnetic conductive material such as Ru, NiCu, Ta.

Subsequently, the connecting magnetic layer 40 will be explained. As illustrated in FIG. 1, the connecting magnetic layer 40 is formed so as to connect the return magnetic pole layer 47 to the write shield layer 60 on the side closer to the ABS 30 than is the thin-film coil 51. The connecting magnetic layer 40 is formed using a magnetic material made of a ferromagnetic body such as NiFe, CoNiFe, CoFe or the like. The connecting magnetic layer 40 includes a receding connecting part 41, a middle connecting part 42 and a front end shield part 43.

The receding connecting part 41 is arranged at a position distanced from the ABS 30, closer to the ABS 30 than is the thin-film coil 51. Further, a lower face of the receding connecting part 41 is connected to an upper face 47b of the return magnetic pole layer 47 on the main magnetic pole layer 26 side, an upper face 41b of the main magnetic pole layer 26 side is connected to middle connecting part 42 (see FIG. 5).

Figure 11:
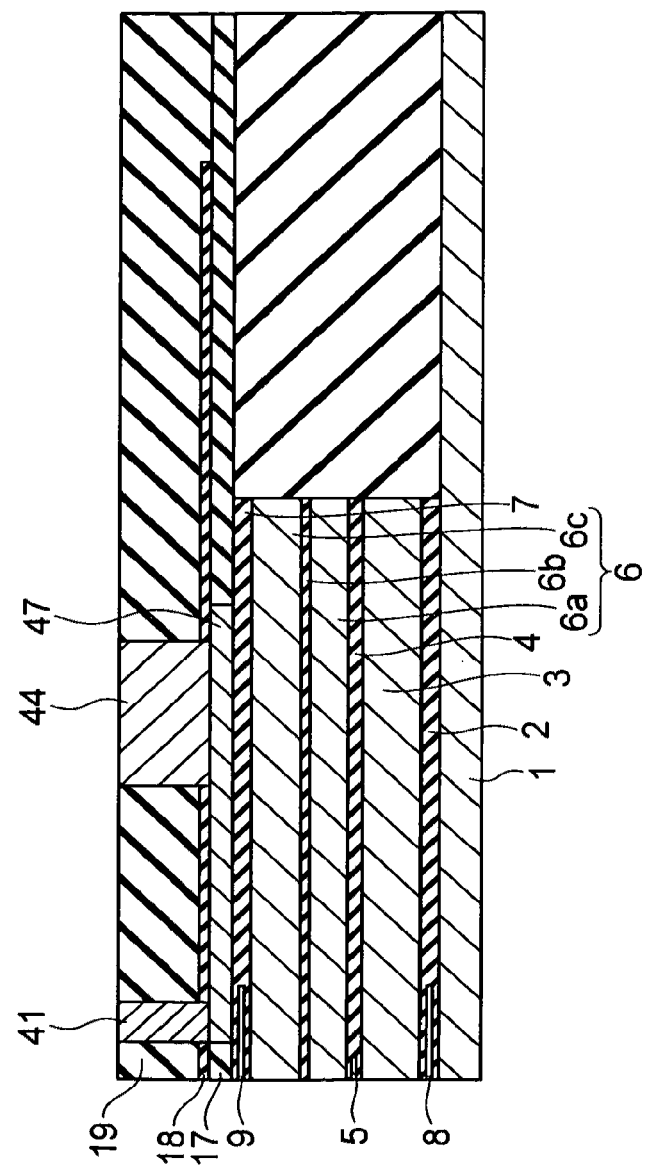
FIG. 11 is a sectional view corresponding to FIG. 1, illustrating a step subsequent to that of FIG. 10.

Further, an opposing insulating layer 19 is formed on the ABS 30 side of the receding connecting part 41. As illustrated in FIG. 11, an upper face of the opposing insulating layer 19 is formed flatly without level difference to the upper face 41b of the receding connecting part 41 (see FIG. 5, about the upper face 41b).

The middle connecting part 42 connects the receding connecting part 41 and the front end shield part 43. The middle connecting part 42 is located in the middle between the receding connecting part 41 and the front end shield part 43. The middle connecting part 42 is connected to the upper face 41b of the receding connecting part 41 and is connected, at the opposite side thereto, to the front end shield part 43. Further, the middle connecting part 42 has a depth extending from the ABS 30 and reaching a rear end part 41r of the receding connecting part 41. The rear end part 41r is a part most distanced from the ABS 30 of the receding connecting part 41. Further, the middle connecting part 42 has a middle shield end face 42a. The middle shield end face 42a is disposed in the ABS 30. The middle shield end face 42a is connected to a later-described shield end face 43a and formed flat without level difference to the shield end face 43a.

The front end shield part 43 is connected to an upper end face 42b of the middle connecting part 42, and a nonmagnetic thin-film 25 is formed on an upper face thereof opposite to the middle connecting part 42. The front end shield part 43 includes a shield end face 43a. The shield end face 43a is arranged in the ABS 30. As illustrated in FIG. 6, a later-described write shield end face 61a is connected on an upper side of the shield end face 43a, the middle shield end face 42a is connected on the opposite side of the shield end face 43a.

Further, in the front end shield part 43, a v-groove part 43c is formed at a middle part in the width direction. The v-groove part 43c is formed in an almost v-shape in cross section in the direction along ABS 30. The bottom part of the v-groove part 43c has a two-stage tilt structure according to the lower face of the track width determining part of the main magnetic pole layer 26. As illustrated in FIG. 6, the later-described nonmagnetic thin-film 25 and the track width determining part of the main magnetic pole layer 26 are housed inside the v-groove part 43c. The nonmagnetic thin-film 25 is formed on an inner face inside the v-groove part 43c. A gap layer 29 is formed on the upper side of the v-groove part 43c in a manner to cover the v-groove part 43c.

Further, the front end shield part 43 has a cutout part 43d. The cutout part 43d is formed on the rear side of the v-groove part 43c. Inside the cutout part 43d, a part of the wider part of the main magnetic pole layer 26 is housed.

The return magnetic pole layer 47 is disposed on the side opposite to the write shield layer 60 with the main magnetic pole layer 26 intervening therebetween. Further, the return magnetic pole layer 47 is formed at a position distanced from the ABS 30. Furthermore, the receding connecting part 41 is connected to the upper face 47b of the return magnetic pole layer 47 on the side closer to the ABS 30 than are later-described turn parts 51g, 51e, 51c, and a later-described first linking magnetic part 44 is connected at a position thereof distanced more from the ABS 30 than are the turn parts 51g, 51e, 51c.

Next, the linking magnetic layer 49 will be explained. By the linking magnetic layer 49, the return magnetic pole layer 47 and the main magnetic pole layer 26 are linked together at a position more distant from the ABS 30 than are the turn parts 51g, 51e, 51c. The linking magnetic layer 49 includes a first linking magnetic part 44, a second linking magnetic part 45, a third linking magnetic part 46. In the first linking magnetic part 44, the upper face is formed without level difference to the upper face 41b of the receding connecting part 41. The second linking magnetic part 45 is connected to the upper face of the first linking magnetic part 44, and the third linking magnetic part 46 is connected to the upper face of the second linking magnetic part 45.

Further, in the thin-film magnetic head 300, the thin-film coil 51 has a later-described single-layer structure so that the following magnetic circuit MC (see FIG. 18) is formed. More specifically, the magnetic circuit MC starts from the connecting magnetic layer 40 and reaches the main magnetic pole layer 26 through the return magnetic pole layer 47 and the linking magnetic layer 49 without straddling the coil. Further, the magnetic circuit MC has a gap extending from the magnetic pole end face 26a of the main magnetic pole layer 26 and reaching the shield end face 43a. A closed circuit like this circuit through which the magnetic flux passes is called a magnetic circuit. No coil is wound in the magnetic circuit MC.

Next, the thin-film coil 51 will be explained. As illustrated in FIG. 4, the thin-film coil 51 has three turn parts 51g, 51e, 51c. A current corresponding to data to be recorded on a recording medium is flowed through the thin-film coil 51. A recording magnetic field is generated around the thin-film coil 51 by the current. The upper thin-film coil 51 is wound as a flat spiral around the write shield layer 60. In addition, the upper thin-film coil 51 has single-layer structure.

Here, the single-layer structure means a structure that a part wound as a flat spiral (a flat spiral part) is formed only at a position distanced from the substrate 1 than is the main magnetic pole layer 26. When the flat spiral part is formed on both sides of the main magnetic pole layer, the coil in that case does not have the single-layer structure. For example, when the backing coil 609 is formed closer to the substrate than is the main magnetic layer 601, in addition to the thin-film coil 606 as in the conventional PMR 600, the coil in the PMR 600 does not have the single-layer structure.

Three turn parts 51g, 51e, 51c are arranged at respective positions having different distances from the ABS 30. The thin-film coil 51 has a structure which the turn parts 51g, 51e, 51c align with each other while interposing a photoresist layer 55 therebetween. Since the turn part 51g is arranged at a closest position to the ABS 30 of the turn parts 51g, 51e, 51c, the turn part 51g corresponds to a front turn part. The turn part 51c corresponds to a rear turn part.

The thin-film coil 51 has a loop part 51b extending from a connecting part 51a to the turn part 51c, a one-loop part 51d extending from the turn part 51c to the turn part 51e, and a one-loop part 51f extending from the turn part 51e to a turn part 51g, and a half-loop part 51h extending from the turn part 51g to a lead part 14A.

The thin-film coil 51 is constructed as a continuous line from the connecting part 51a to the lead part 14A, thus forming a three-turn loop as a whole. Namely, the connecting part 51a is connected to the lead part 14A through the loop part 51b, the one-loop part 51d, one-loop part 51f and the half-loop part 51h, whereby the 3-turn loop is formed.

Each of the turn parts 51g, 51e, 51c has a longitudinally long structure in which the thickness (height in a direction (upper and lower direction) along with the ABS 30) greater than the lateral width. The narrowest part in the one-loop part 51f, the one-loop part 51d, the loop part 51b are the turn part 51g, 51e, 51c respectively. Note that the lateral width means width in a direction (intersecting direction) intersecting the ABS 30, in this embodiment.

Subsequently, the write shield layer 60 will be explained. The write shield layer 60 has an opposing shield part 61 and a cover shield part 62.

The opposing shield part 61 is formed such as to oppose the main magnetic pole layer 26, nonmagnetic layer 27, and nonmagnetic layer 28 sequentially from the ABS 30 side through the gap layer 29. The opposing shield part 61 has a flat upper end face, to which the cover shield part 62 is connected.

The opposing shield part 61 has a write shield end face 61a as illustrated in FIG. 6. The write shield end face 61a is disposed in the ABS 30. The opposing shield part 61 opposes the front end shield part 43 in the ABS 30. Further, the write shield end face 61a is connected to the shield end face 43a in the ABS 30. Further, as illustrated in FIG. 6, the write shield end face 61a and the shield end face 43a surround the entire magnetic pole end face 26a. In addition, the write shield end face 61a and the shield end face 43a are disposed very near the magnetic pole end face 26a with only the gap layer 29 or the nonmagnetic thin-film 25 intervening therebetween. The write shield end face 61a and the shield end face 43a are disposed around the magnetic pole end face 26a via the gap layer 29 or the nonmagnetic thin-film 25 in the ABS 30.

A very small space which the gap layer 29 is arranged is formed in the write shield end face 61a. A part of ABS 30 side of the gap layer 29 is formed in the very small space.

The cover shield part 62 has a curved structure extending in the depth direction from the ABS 30, straddling the thin-film coil 51 and connecting to the upper yoke layer 65.

The upper yoke layer 65 is connected to a rear side of the upper face 26d in the main magnetic pole layer 26, distanced more from the ABS 30 than is the nonmagnetic layers 27, 28. An upper face of the upper yoke layer 65 is formed without level difference to an upper face of the opposing shield part 61. The upper face of the upper yoke layer 65 forms a common flat surface 59A (see FIG. 16) together with the upper face of the opposing shield part 61.

Further, the thin-film magnetic head 300 has a protective insulating layer 90. The protective insulating layer 90 is formed using an insulating material such as alumina ($Al_2O_3$). The protective insulating layer 90 is formed so as to cover the write shield layer 60.

(Method of Manufacturing Thin-Film Magnetic Head)

A method of manufacturing the thin-film magnetic head 300 having the structure mentioned above will now be explained with reference to FIG. 9 to FIG. 17 together with FIG. 1, FIG. 2 mentioned above.

FIG. 9 to FIG. 17 is sectional view corresponding to FIG. 1 in respective step of manufacturing the thin-film magnetic head 300.

Figure 9:
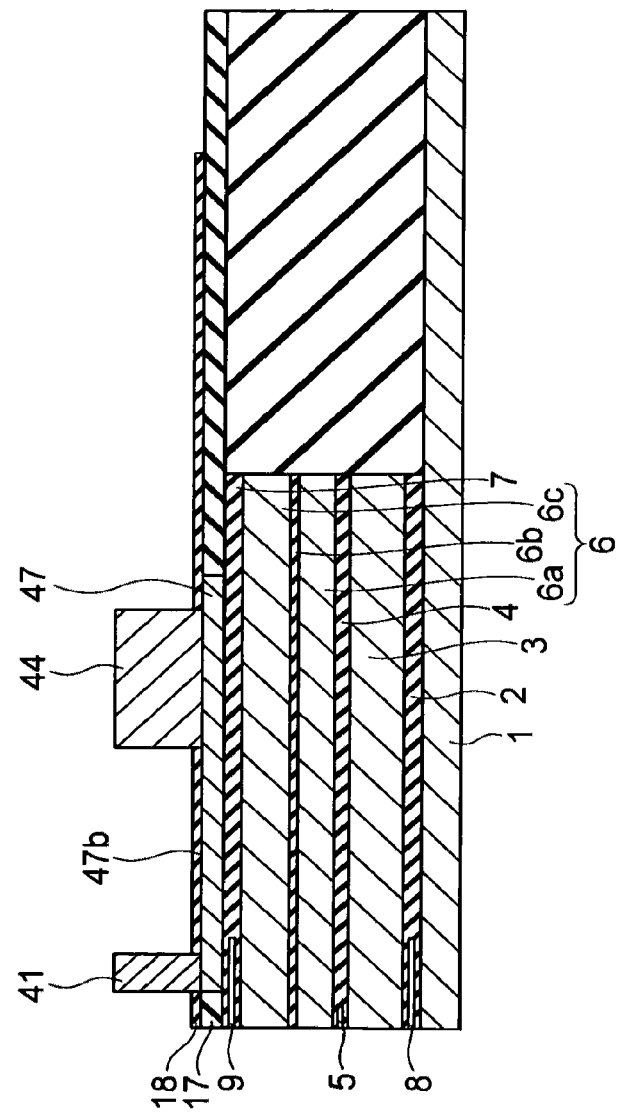
FIG. 9 is a sectional view corresponding to FIG. 1, illustrating a step of manufacturing the thin-film magnetic head illustrated in FIG. 1.

First, the substrate 1 made of a ceramic material such as aluminum oxide-titanium carbide ($Al_2O_3.TiC$) is prepared. Subsequently, as illustrated in FIG. 9, the insulating layer 2 made of an insulating material such as alumina ($Al_2O_3$) and the lower shield layer 3 made of a magnetic material are successively formed on the substrate 1. The heating part 8 is formed when the insulating layer 2 is formed.

Then, the shield gap film 4 is formed by an insulating material such as to shield the MR device 5. Here, an undepicted lead connected to the MR device 5 is formed, and the MR device 5 and the lead are covered with the shield gap film 4. Thereafter, using a magnetic material and an insulating material, the upper shield layer 6 (the first shield part 6a, the insulating part 6b, the second shield part 6c) is formed on the shield gap film 4.

Next, the insulating layer 7, for separating the upper shield layer 6 and a recording head to be formed later from each other, is formed on the upper shield layer 6 by an insulating material such as alumina ($Al_2O_3$). The heat sensing part 9 is formed when the insulating layer 7 is formed. The foregoing steps yield a multilayer body for forming the recording head.

Then, a return magnetic pole layer forming step is performed. In this step, first, a magnetic layer (having a thickness of about 0.6 μm) for forming the return magnetic pole layer 47 is formed using a magnetic material made of a ferromagnetic body such as NiFe or CoNiFe. This magnetic layer is formed at positions separated from the ABS 30.

Subsequently, an insulating layer is formed on the surface of the multilayer body, and the surface of the multilayer body is flattened by chemical mechanical polishing (hereinafter, referred to as "CMP"). This forms a front end insulating layer 17 and the return magnetic pole layer 47. By this, the return magnetic pole layer 47 is formed so as to be arranged at a position distanced 0.3 to 1 μm (about 0.5 μm, in this embodiment) from the ABS 30. The front end insulating layer 17 is formed between an end part on the ABS 30 side of the receded return magnetic pole layer 47 and the ABS 30.

Next, an insulating layer 18 (having a thickness of about 0.1 to 0.3 μm) made of alumina ($Al_2O_3$) is formed on the whole surface of the multilayer body. Then, after applying a photoresist to the whole surface of the multilayer body, patterning is performed with a predetermined photomask, so as to form a resist pattern (not depicted). Using this resist pattern as a mask, etching such as RIE is performed, so as to selectively perforate the insulating layer 18.

Then, a magnetic layer forming step is performed. The magnetic layer forming step is a step for forming the connecting magnetic layer 40 and the linking magnetic layer 49. In this embodiment, a coil is not formed in the middle of performing this magnetic layer forming step. By this, the magnetic layer forming step is able to be performed so as to be formed the above-described magnetic circuit MC.

In the magnetic layer forming step, the middle connecting part 42 and the front end shield part 43, the second linking magnetic part 45 and the third linking magnetic part 46 as well as the receding connecting part 41 and the first linking magnetic part 44 are formed as follows. Though described later in detail, in the magnetic layer forming step, the receding connecting part 41, the middle connecting part 42 and the front end shield part 43 of the connecting magnetic layer 40 are formed in the order of the receding connecting part 41, the middle connecting part 42 and the front end shield part 43. Further, the connecting magnetic layer 40 is formed to be disposed closer to the ABS 30 than is the thin-film coil 51. Further, the first linking magnetic part 44, the second linking magnetic part 45 and the third linking magnetic part 46 of the linking magnetic layer 49 are formed in the order of the first linking magnetic part 44, the second linking magnetic part 45 and the third linking magnetic part 46.

First, the receding connecting part 41 and the first linking magnetic part 44 are formed by frame plating using a magnetic material made of a ferromagnetic body such as NiFe or CoNiFe, by a thickness of about 1 to 1.5 μm. However, the receding connecting part 41 is arranged closer to the ABS 30 than is the first linking magnetic part 44.

Figure 10:
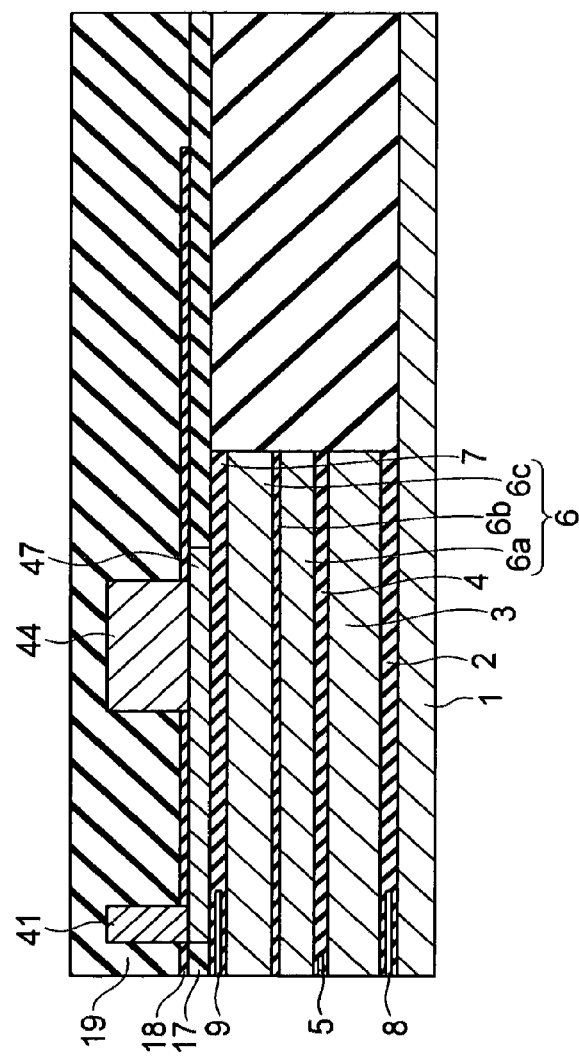
FIG. 10 is a sectional view corresponding to FIG. 1, illustrating a step subsequent to that of FIG. 9.

Next, as illustrated in FIG. 10, an insulating layer 19 (having a thickness of about 2 to 3.5 μm) made of alumina ($Al_2O_3$) is formed on the whole surface of the multilayer body by CVD (Chemical Vapor Deposition) according to an atomic layer method. The insulating layer 19 is formed so as to cover the receding connecting part 41 and the first linking magnetic part 44.

Subsequently, the surface of the multilayer body is polished by CMP until the receding connecting part 41 and the first linking magnetic part 44 emerge, so as to become flat. This forms the receding connecting part 41 and the first linking magnetic part 44, as illustrated in FIG. 11.

Besides, an opposing insulating layer 19 is formed closer to the ABS 30 than are the receding connecting part 41, by the flattening. Further, by the same flattening, an upper face 41b of the receding connecting layer 41, an upper face of the opposing insulating layer 19 and an upper face of the first linking magnetic part 44 are formed flatly without level difference.

Figure 12:
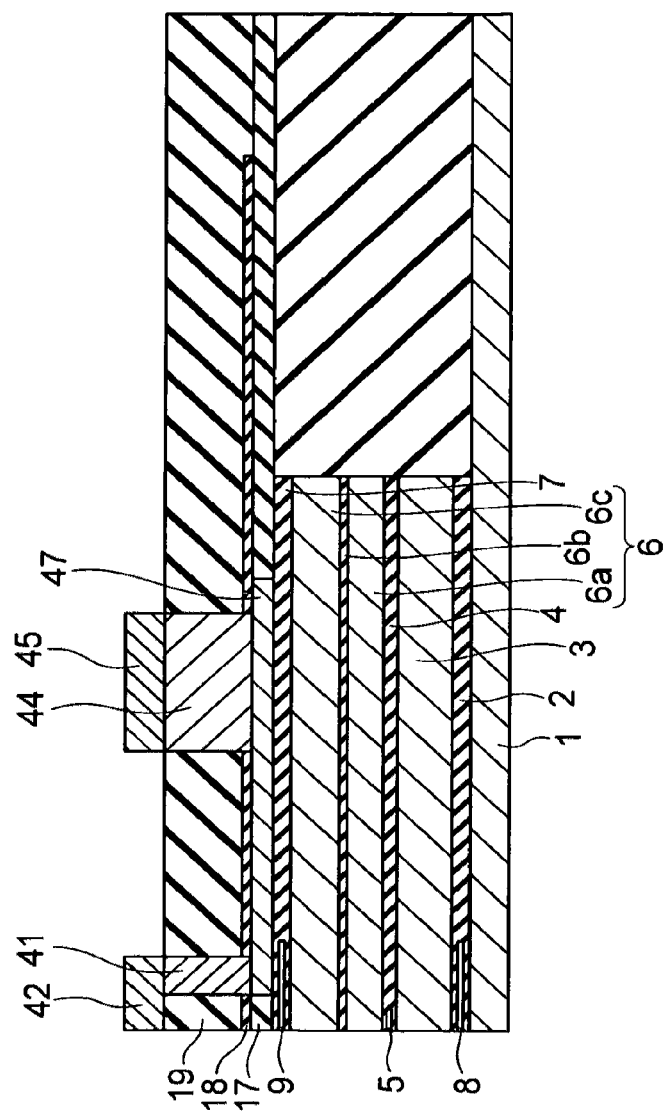
FIG. 12 is a sectional view corresponding to FIG. 1, illustrating a step subsequent to that of FIG. 11.

Subsequently, as illustrated in FIG. 12, the middle connecting part 42 and the second linking magnetic part 45 are formed on an upper face 41b of the receding connecting layer 41 and an upper face of the first linking magnetic part 44 respectively, using a magnetic material made of a ferromagnetic body such as NiFe or CoNiFe or the like. At this time, the middle connecting part 42 is formed so as to have a depth reaching a rear end part 41r from the ABS 30 (see FIG. 5, about the rear end part 41r).

Figure 13:
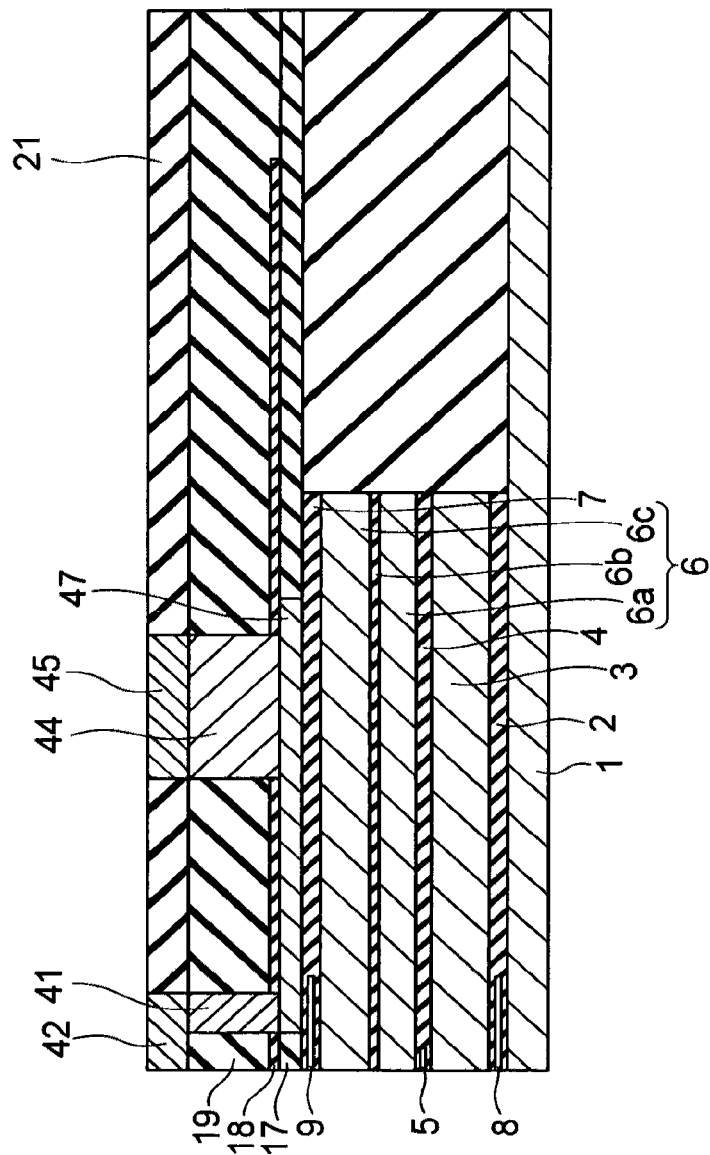
FIG. 13 is a sectional view corresponding to FIG. 1, illustrating a step subsequent to that of FIG. 12.

Then, an insulating layer 21 made of alumina ($Al_2O_3$) is formed on the whole surface of the multilayer body by CVD. After that, the surface of the multilayer body is polished by CMP until the middle connecting part 42 and the second linking magnetic part 45 emerge, so as to become flat. This forms the middle connecting part 42 and the second linking magnetic part 45 as illustrated in FIG. 13.

Figure 14:
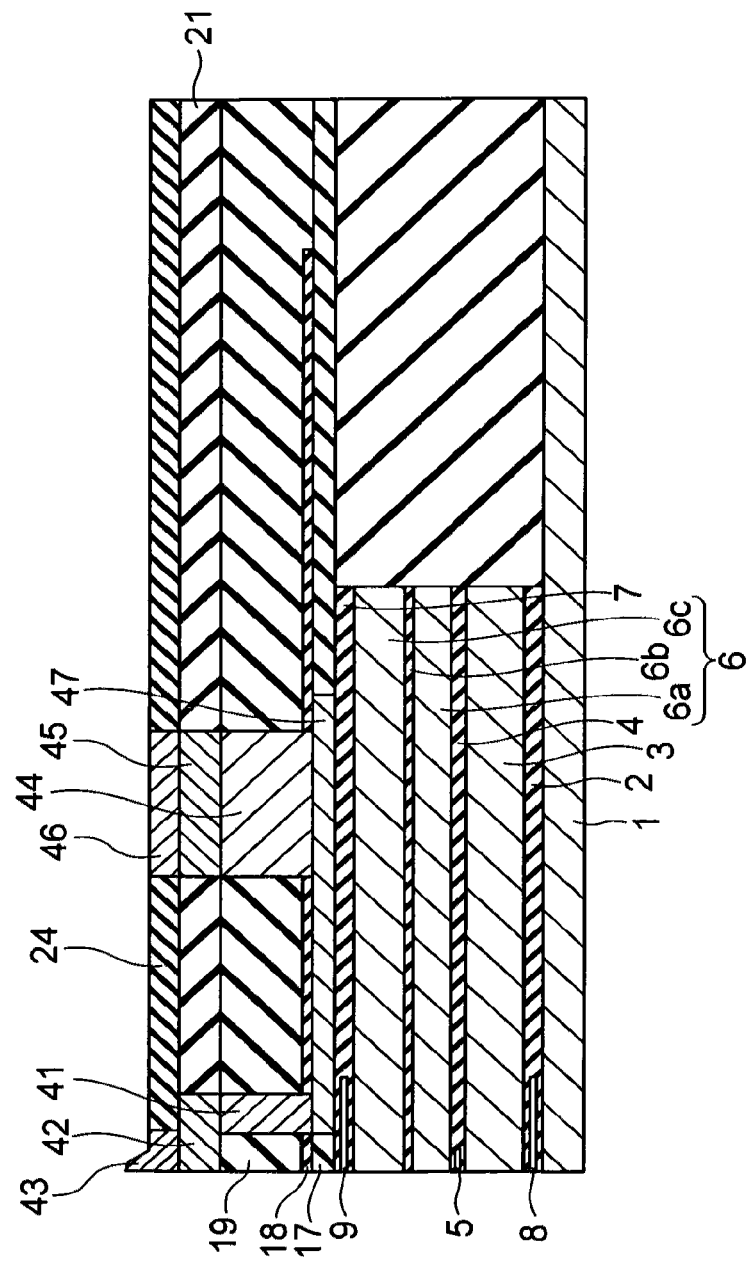
FIG. 14 is a sectional view corresponding to FIG. 1, illustrating a step subsequent to that of FIG. 13.

Then, as illustrated in FIG. 14, the base insulating layer 24 is formed using an insulating material such as alumina ($Al_2O_3$) or the like. After that, the base insulating layer 24 is selectively perforated. Subsequently, a magnetic layer which will be the front end shield part 43 and the third linking magnetic part 46 are formed at the perforated part in a thickness of 0.5 μm to 1.0 μm by the frame plating method using a magnetic material made of a ferromagnetic body such as NiFe or CoNiFe. The linking magnetic layer 49 is formed by forming the third linking magnetic part 46.

Subsequently, photoresist is applied on the surface of the multilayer body and then patterned using a predetermined photomask to form a resist pattern on the surface of the multilayer body. This resist pattern is formed in a shape exposing the surface of the magnetic layer which is to be the front end shield part 43 into a shape according to the v-groove part 43c and the cutout part 43d. Using the resist pattern as a mask, reactive ion etching (hereinafter, referred to as "RIE") is performed to remove a part of the surface of the multilayer body which is not covered with the resist pattern. Thus, the v-groove part 43c and the cutout part 43d are formed in the magnetic layer which is to be the front end shield part 43, whereby the front end shield part 43 is formed. By forming the front end shield part 43, the connecting magnetic layer 40 is formed. Since the front end shield part 43 includes the shield end face 43a, the connecting magnetic layer 40 is formed so as to have the shield end face 43a.

Figure 15:
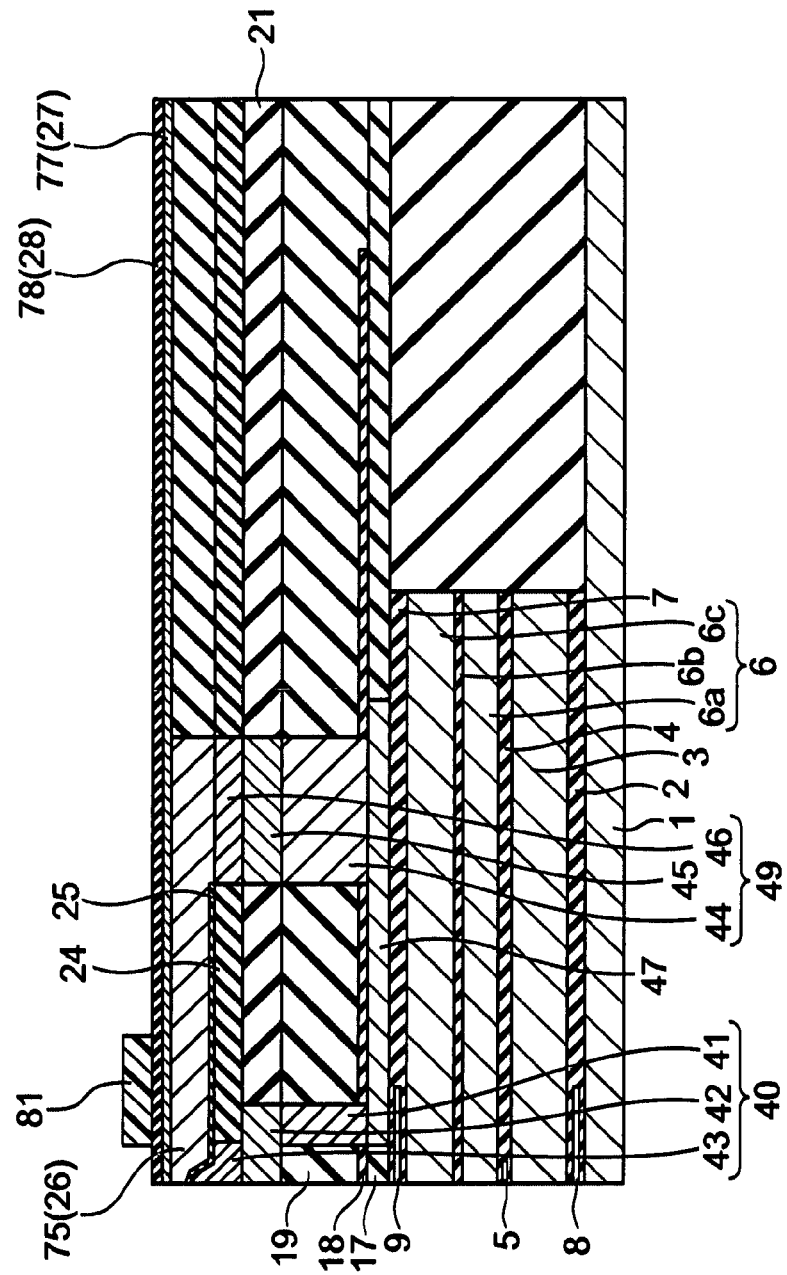
FIG. 15 is a sectional view corresponding to FIG. 1, illustrating a step subsequent to that of FIG. 14.

After that, as shown in illustrated in FIG. 15, a nonmagnetic thin-film 25 is formed so as to cover the base insulating layer 24 and the front end shield part 43. The nonmagnetic thin-film 25 is formed by sputtering with a nonmagnetic metal material such as Ru, NiCr, or NiCu, or an insulating material such as alumina. The nonmagnetic thin-film 25 is also formed at v-groove part 43c of the front end shield part 43.

Subsequently, a main magnetic pole layer forming step is performed. In this step, the main magnetic pole layer 26 is formed as follows on the connecting magnetic layer 40 and the linking magnetic layer 49.

First, a magnetic layer 75 having a thickness of about 0.4 to 0.8 μm is formed on the whole surface of the multilayer body by sputtering. The magnetic layer 75 is formed using a magnetic material made of a ferromagnetic body such as CoNiFe, CoFe, NiFe. By this magnetic layer 75, the main magnetic pole layer 26 will be formed later. Further, the whole surface of the multilayer body is polished by CMP, so as to become flat.

After that, a nonmagnetic layer 77 (having a thickness of about 0.04 to 0.1 μm) is formed on the whole surface of the multilayer body by sputtering with a metal material such as Ru, NiCr, or NiCu. The nonmagnetic layer 77 will partly be etched away later, so as to become the above-mentioned nonmagnetic layer 27. Further, using an inorganic insulating material such as alumina ($Al_2O_3$) or silicon oxide, a nonmagnetic layer 78 (having a thickness of about 0.1 to 0.3 μm) is formed on the whole surface of the multilayer body. The nonmagnetic layer 78 will partly be etched away later, so as to become the above-mentioned nonmagnetic layer 28.

Subsequently, after applying a photoresist to the whole surface of the multilayer body, patterning with a predetermined photomask is performed, so as to form a resist pattern 81 near the ABS 30.

Next, using the resist pattern 81 as a mask, etching such as RIE, for example, is performed, so as to remove a part of the nonmagnetic layer 78. The etching in this case is performed such as to stop at the time when the bottom part of a groove formed by etching reaches the upper face of the nonmagnetic layer 77. To this aim, a material yielding an etching rate lower than that of the nonmagnetic layer 77 is used for the nonmagnetic layer 78.

After that, the resist pattern 81 is removed. Then, using the remaining nonmagnetic layer 78 as a mask, a part of the nonmagnetic layer 77 is etched away by ion beam etching (will also be referred to as IBE), for example. Further, using the remaining nonmagnetic layer 77 as a mask, a part of the magnetic layer 75 is etched away by IBE, for example. By performing these steps, the upper surface on the ABS side of the magnetic layer 75 is formed with the above-described two-stage tilt structure.

Figure 16:
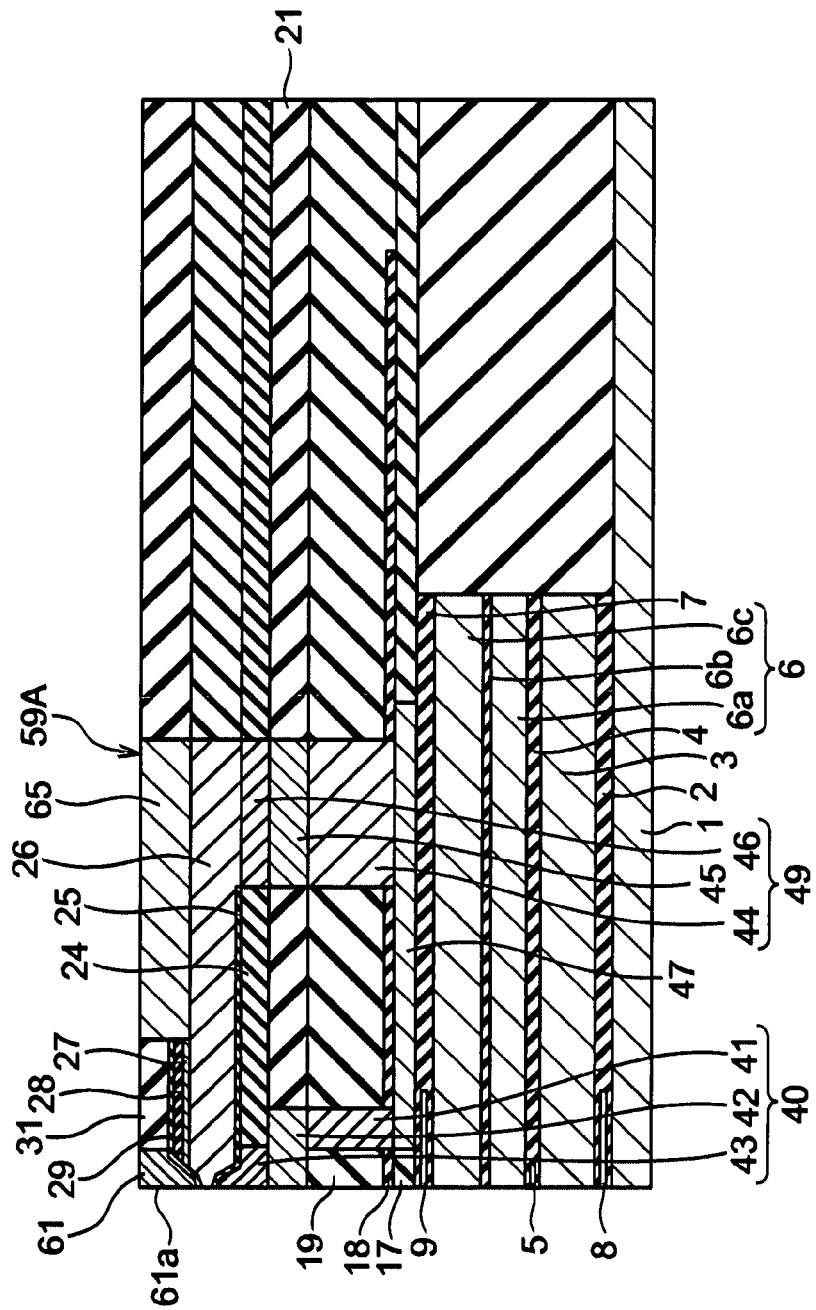
FIG. 16 is a sectional view corresponding to FIG. 1, illustrating a step subsequent to that of FIG. 15.

Subsequently, as illustrated in FIG. 16, the gap layer 29 (having a thickness of about 250 Å to 350 Å) is formed on the whole surface of the multilayer body by sputtering or CVD with an insulating material such as alumina ($Al_2O_3$) or a nonmagnetic conductive material such as Ru, NiCu, or Ta.

Further, an undepicted stopper film is formed by sputtering, for example, and a nonmagnetic film is formed thereon. Subsequently, an undepicted photoresist is applied to the whole surface of the multilayer body. Then, patterning with a predetermined photomask is performed, so as to form an undepicted resist pattern. Using this resist pattern as a mask, the nonmagnetic film is etched by RIE, for example. This etching is performed such as to stop when the bottom part of a groove formed by etching reaches the upper face of the stopper film.

Then, after removing the resist pattern that is not depicted, the remaining nonmagnetic film is used as a mask for partly etching the gap layer 29, nonmagnetic layer 77 and nonmagnetic layer 78 away by RIE or the like. Here, the gap layer 29, nonmagnetic layer 77 and nonmagnetic layer 78 are partly removed, so as to secure a space for forming the above-mentioned upper yoke layer 65.

Subsequently, a write shield layer forming step is performed. In this step, the write shield layer 60 is formed as follows. First, the opposing shield part 61 is formed. Next, the write shield layer 60 is formed by forming the cover shield part 62 after forming of the thin-film coil 51.

Then, when the opposing shield part 61 is formed, a magnetic layer is formed on the whole surface of the multilayer body. This magnetic layer is formed by plating method using a magnetic material made of a ferromagnetic body such as CoNiFe, CoFe, CoFeN, NiFe or the like by a thickness of about 0.5 to 1.2 μm. This magnetic layer will later form the opposing shield part 61 and the upper yoke layer 65.

Next, an insulating layer (having a thickness of about 1 to 3 μm) is formed on the whole surface of the multilayer body using an insulating material such as alumina ($Al_2O_3$). Further, the whole surface of the multilayer body is polished by CMP until the a surface of the magnetic layer emerges, so as to be made flat. This forms the opposing shield part 61, the upper yoke layer 65 and an insulating layer 31. At this time, the surface of the multilayer body is polished such that the opposing shield part 61 has a thickness of about 0.5 to 1.0 μm. Besides, the opposing shield part 61 is formed so as to have the write shield end face 61a.

Figure 17:
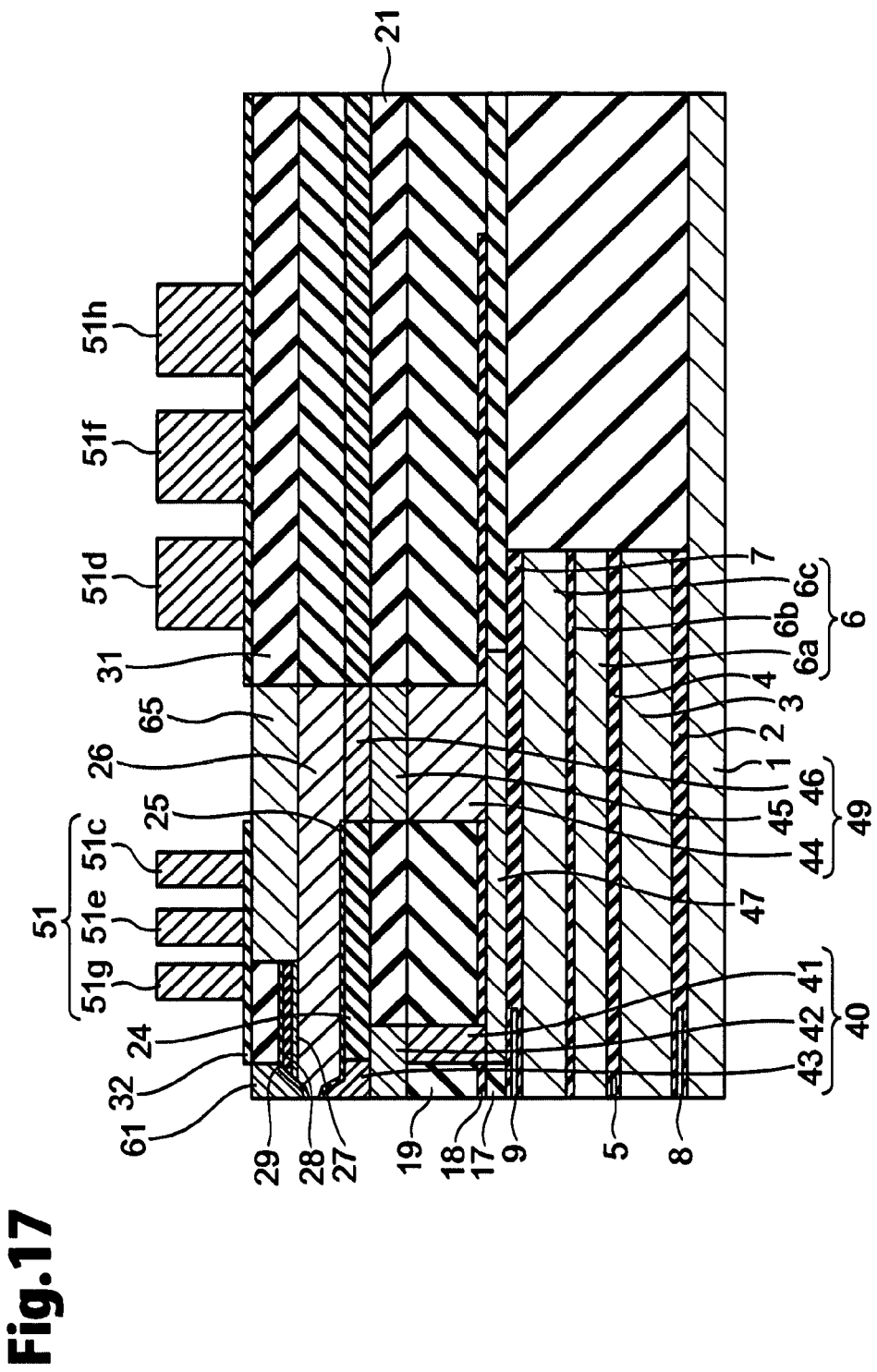
FIG. 17 is a sectional view corresponding to FIG. 1, illustrating a step subsequent to that of FIG. 16.

Next, as illustrated in FIG. 17, an insulating layer 32 is formed on the whole surface of the multilayer body using an insulating material such as alumina ($Al_2O_3$). Subsequently, openings are formed at the positions corresponding to the upper face of the opposing shield part 61 and the upper face of the upper yoke layer 65 respectively.

After that, a thin-film coil forming process is performed. In this step, the thin-film coil 51 is formed so as to have the single-layer structure. Before performing the thin-film coil forming process, the main magnetic pole layer forming process has already been performed. In addition, a coil is not formed in the process until now. Therefore, the thin-film coil 51 is able to be formed so as to have the single-layer structure, by forming the thin-film coil 51 on the insulating layer 32, for example by plating method. Subsequently, the photoresist layer 55 is formed so as to be embedded gaps such as turn parts 51g, 51e, 51c constituting the thin-film coil 51.

After that, the cover shield part 62 is formed so as to straddle a part on the ABS 30 side of the photoresist layer 55. After that, the protective insulating layer 90 is formed by an insulating material such as alumina ($Al_2O_3$) so as to cover the entire multilayer body, whereby the thin-film magnetic head 300 is completed.

(Operation and Effect of Thin-Film Magnetic Head 300)

As in the foregoing, the thin-film magnetic head 300 has the middle connecting part 42. The middle connecting part 42 has a lateral width extending from the ABS 30 and reaching the rear end part 41r of the receding connecting part 41. Therefore, even though the connecting magnetic layer 40 has a different-distance structure, the middle connecting part 42 is surely connected to both the front end shield part 43 and the receding connecting part 41. Further, the connecting magnetic layer 40, the return magnetic pole layer 47, the linking magnetic layer 49 and the main magnetic pole layer 26 form the magnetic circuit MC in which no coil is wound. Note that the different-distance structure means a structure that the respective distances of the opposing shield part 61 and the linking shield part 63 from the ABS 30 are different because the opposing shield part 61 is disposed in the ABS 30 and the linking shield part 63 is recedes from the ABS 30.

Here, a case that a recording current is passed through the thin-film coil 51 is considered. In this case, a magnetic field (a recording magnetic field) according to the recording current is formed in the main magnetic pole layer 26. From this recording magnetic field, the magnetic flux density at each point of the main magnetic pole layer 26 is obtained and the magnetic flux densities are integrated for the entire cross-section of the main magnetic pole layer 26, whereby the magnetic flux passing through the main magnetic pole layer 26 is obtained.

Figure 18:
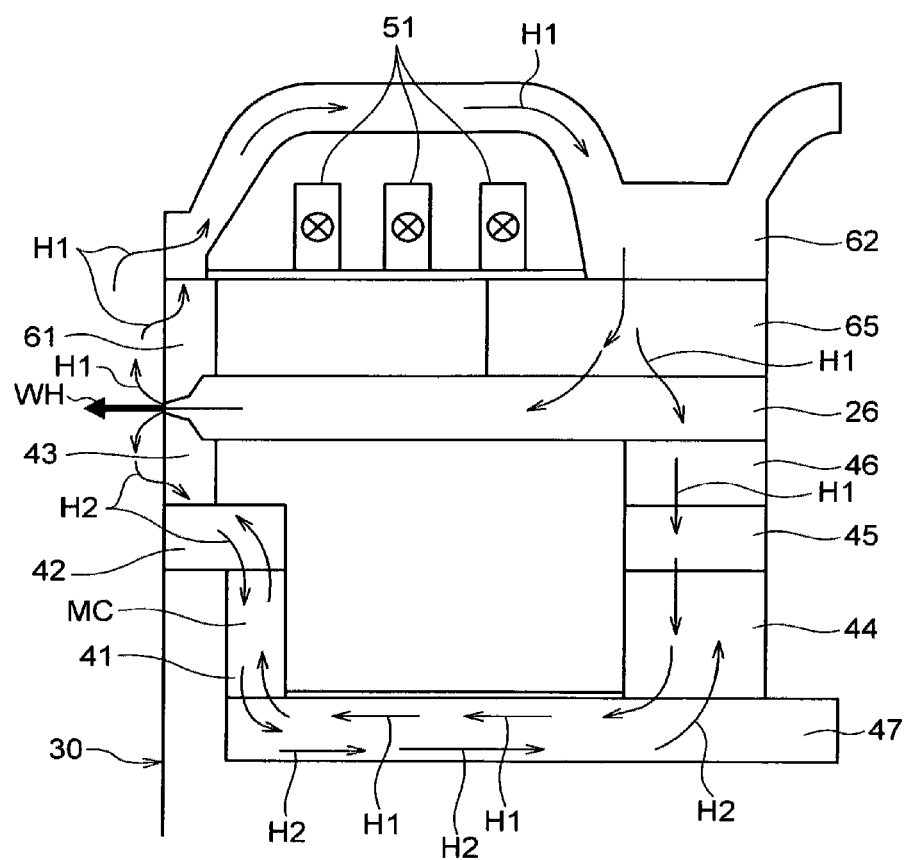
FIG. 18 is a view schematically illustrating a flow of a magnetic flux in the thin-film magnetic head illustrated in FIG. 1.

Generally, the magnetic field formed by the current is formed in the direction following the right-handed screw rule. Therefore, as illustrated in FIG. 18, the component of the recording current flowing through the thin-film coil 51 and directing from the front side of the paper surface to the rear surface (referred also to as a positive direction component)

forms a recording magnetic field in the direction directing from the main magnetic pole layer 26 to the recording medium. Then, a magnetic flux WH according to the recording field, which travels from the magnetic pole end face 26$a$ in a direction perpendicular to the recording medium, magnetizes a perpendicular recording layer of the recording medium to record data on the recording medium.

On the other hand, the thin-film coil 51 is wound as a flat spiral around the write shield layer 60. The recording current flowing through the thin-film coil 51 also contains a component in a direction different from the positive direction component. Therefore, a magnetic flux that a direction is different from the magnetic flux WH is included in magnetic fluxes traveling outward from the magnetic pole end face 26$a$ of the main magnetic pole layer 26. Among the magnetic fluxes, a magnetic flux H1 approaching the write shield layer 60 flows from the opposing shield part 61 through the cover shield part 62 and the upper yoke layer 65 back to the main magnetic pole layer 26. The write shield layer 60 is formed using a magnetic material made of a ferromagnetic body and therefore has a high magnetic permeability so that the magnetic flux significantly easily passes therethrough. Since the opposing shield part 61 of such the write shield layer 60 is disposed near the magnetic pole end face 26$a$, the magnetic flux H1 passes through the opposing shield part 61.

However, the linking magnetic layer 49 is connected to the main magnetic pole layer 26, so that when the magnetic flux H1 flows back to the main magnetic pole layer 26, a part of the magnetic flux H1 flows from the main magnetic pole layer 26 to the return magnetic pole layer 47 through the linking magnetic layer 49. This magnetic flux H1 travels through the return magnetic pole layer 47 in the direction directing the ABS 30.

Incidentally, the shield magnetic pole layer 608 corresponding to the return magnetic pole layer is exposed in the ABS in the conventional PMR 600. Therefore, the magnetic flux is likely to be emitted from the shield magnetic pole layer 608 in the ABS into the ABS.

However, in the thin-film magnetic head 300, the return magnetic pole layer 47 is formed at a position distanced from the ABS 30 and the front end insulating layer 17 is formed on the ABS 30 side of the return magnetic pole layer 47, so that the magnetic flux is hardly emitted from the return magnetic pole layer 47. Also in this point, the effect of improving WATE is increased. In addition to this point, the connecting magnetic layer 40 is formed in the thin-film magnetic head 300, so that the effect of highly improving WATE is achieved. In the thin-film magnetic head 300, the effect of improving WATE is obtained without including the backing coil, and its reason will be described as follows.

As illustrated in FIG. 18, the magnetic flux that a direction is different from the magnetic flux WH, among the magnetic fluxes emitted from the main magnetic pole layer 26, are divided into two flows of the above-described magnetic flux H1 and a magnetic flux H2 traveling in the direction approaching the connecting magnetic layer 40.

Further, in the thin-film magnetic head 300, by connecting the write shield layer 60 to the return magnetic pole layer 47 by the connecting magnetic layer 40, the magnetic flux H2 easily flows back to the return magnetic pole layer 47 through the connecting magnetic layer 40. Furthermore, the magnetic circuit MC is formed closer to the substrate 1 than is the main magnetic pole layer 26. The connecting magnetic layer 40 and the return magnetic pole layer 47 constituting the magnetic circuit MC are formed using a magnetic material made of a ferromagnetic body. Therefore, as with the magnetic flux H1 passing through the write shield layer 60, the magnetic flux H2 directs from the connecting magnetic layer 40 to the return magnetic pole layer 47 in the magnetic circuit MC, then directs therefrom to the main magnetic pole layer 26 through the linking magnetic layer 49. The magnetic flux H2 passes through the return magnetic pole layer 47 toward the direction going away from the ABS 30. Therefore, the magnetic flux H2 flows backward with the magnetic flux H1 passing through the return magnetic pole layer 47.

The magnetic flux H2 functions to weaken the magnetic function of the magnetic flux H1 inside the return magnetic pole layer 47 and therefore substitutes for the backward magnetic flux generated by the backing coil. Therefore, excessive magnetic flux is hardly emitted from the return magnetic pole layer 47 toward the ABS 30 without the backing coil in the thin-film magnetic head 300. Thus, the effect of improving WATE higher than that in the prior art can be achieved in the thin-film magnetic head 300 without the backing coil.

The thin-film coil 51 is formed as a flat spiral having the above-described single-layer structure and no coil is wound in the magnetic circuit MC. Then, the magnetic flux passing from the connecting magnetic layer 40 to the main magnetic pole layer 26 through the magnetic circuit MC will be generated by the recording current flowing through the thin-film coil 51 as with the magnetic flux according to the recording magnetic field. Therefore, the magnetic flux H2 is considered to have less possibility of affecting the recording medium unlike the magnetic flux caused by the backing coil.

Further, the connecting magnetic layer 40 has the front end shield part 43, and the front end shield part 43 has the shield end face 43$a$. The shield end face 43$a$ is connected to the write shield end face 61$a$ in the ABS 30. The write shield end face 61$a$ and the shield end face 43$a$ surround the magnetic pole end face 26$a$ via the gap layer 29 or the nonmagnetic thin-film 25 and are disposed near the magnetic pole end face 26$a$. Therefore, when the magnetic flux is emitted from the magnetic pole end face 26$a$, the magnetic flux that a direction is different from the magnetic flux WH easily passes through the write shield end face 61$a$ or the shield end face 43$a$ before affecting the recording medium, and the magnetic flux that a direction is different from the magnetic flux WH is likely to be taken in by the write shield end face 61$a$ or the shield end face 43$a$. Accordingly, it is possible to effectively prevent the magnetic flux that the direction is different from the magnetic flux WH from reaching the recording medium in the thin-film magnetic head 300.

Further, the write shield end face 61$a$ and the shield end face 43$a$ surround the magnetic pole end face 26$a$ via the gap layer 29 or the nonmagnetic thin-film 25, and the gap layer 29 or the nonmagnetic thin-film 25 is disposed between the main magnetic pole layer 26 and the write shield layer 60, the connecting magnetic layer 40. Therefore, the magnetic flux never leaks from the main magnetic pole layer 26 into the write shield layer 60 and the connecting magnetic layer 40. Accordingly, the magnetic flux emitted from the magnetic pole end face 26$a$ of the main magnetic pole layer 26 can be strengthened and the recording property of the thin-film magnetic head 300 can also be increased.

Incidentally, to surely connect the front end shield part 43 disposed in the ABS 30 and the return magnetic pole layer 47 distanced from the ABS 30, a connecting magnetic layer 40 including the following magnetic layer may be formed in place of the receding connecting part 41 and the middle connecting part 42. This magnetic layer has an end face disposed in the ABS 30 and has a size in contact with the front end shield part 43 and capable of coming into contact with the rear end part 41$r$.

However, when the connecting magnetic layer 40 with such a magnetic layer is formed, the magnetic layer is largely exposed in the ABS 30. The magnetic layer is also formed using a magnetic material made of a ferromagnetic body such as CoNiFe, CoFe, CoFeN, NiFe or the like. If the magnetic layer is largely exposed in the ABS 30, the magnetic layer is more greatly affected by the heat generation of the thin-film coil 51.

Since the frying height is very small, collision between the thin-film magnetic head 300 and the recording medium can occur even when only a limited and small part of the connecting magnetic layer 40 projects. A magnetic layer is exposed in the ABS 30 means that many such small parts which will project exist in the ABS 30, which means that there are accordingly many projecting forms which can collide with the recording medium and collision between the thin-film magnetic head 300 and the recording medium is more likely to occur.

Hence, the connecting magnetic layer 40 having the receding connecting part 41 and the middle connecting part 42 is formed in the thin-film magnetic head 300. The receding connecting part 41 distanced from the ABS 30 and the middle connecting part 42 disposed in the ABS 30 are formed to be connected with each other. In this manner, the part exposed in the ABS 30 is only the middle connecting part 42 except the front end shield part 43.

After the magnetic flux that the direction is different from the magnetic flux WH among the magnetic fluxes emitted from the main magnetic pole layer 26 is divided into the two magnetic flux H1 and magnetic flux H2, in order to take in the magnetic flux H1 and the magnetic flux H2 before they affect the recording medium, it is desirable to connect the write shield layer 60 and the return magnetic pole layer 47 by the magnetic layer on the side closer to the ABS 30 than is the thin-film coil 51. However, this magnetic layer is disposed closer to the ABS 30 than is the thin-film coil 51, so that if the size of the magnetic layer exposed in the ABS 30 is large, the magnetic layer is likely to be affected by the heat generation of the thin-film coil 51.

Hence, the connecting magnetic layer 40 is formed in the thin-film magnetic head 300. The connecting magnetic layer 40 has the receding connecting part 41 and the middle connecting part 42. Therefore, the size of the magnetic layer exposed in the ABS 30 is smaller than that when the above-described magnetic layer is formed. Accordingly, the possibility of protrusion of the magnetic layer caused by the heat generation of the thin-film coil 51 is reduced. Thus, the thin-film magnetic head 300 is configured such that the situation of collision contact with the recording medium is suppressed.

Consequently, the thin-film magnetic head 300 is very unlikely to be damaged by the protrusion of the recording head and thus can approach recording media.

Accordingly, the thin-film magnetic head 300 can enhance the resolution of recording and reproducing heads, thereby improving their signal-to-noise ratio. This can also increase the recording density of the thin-film magnetic head 300.

MODIFIED EXAMPLE 1

Figure 19:
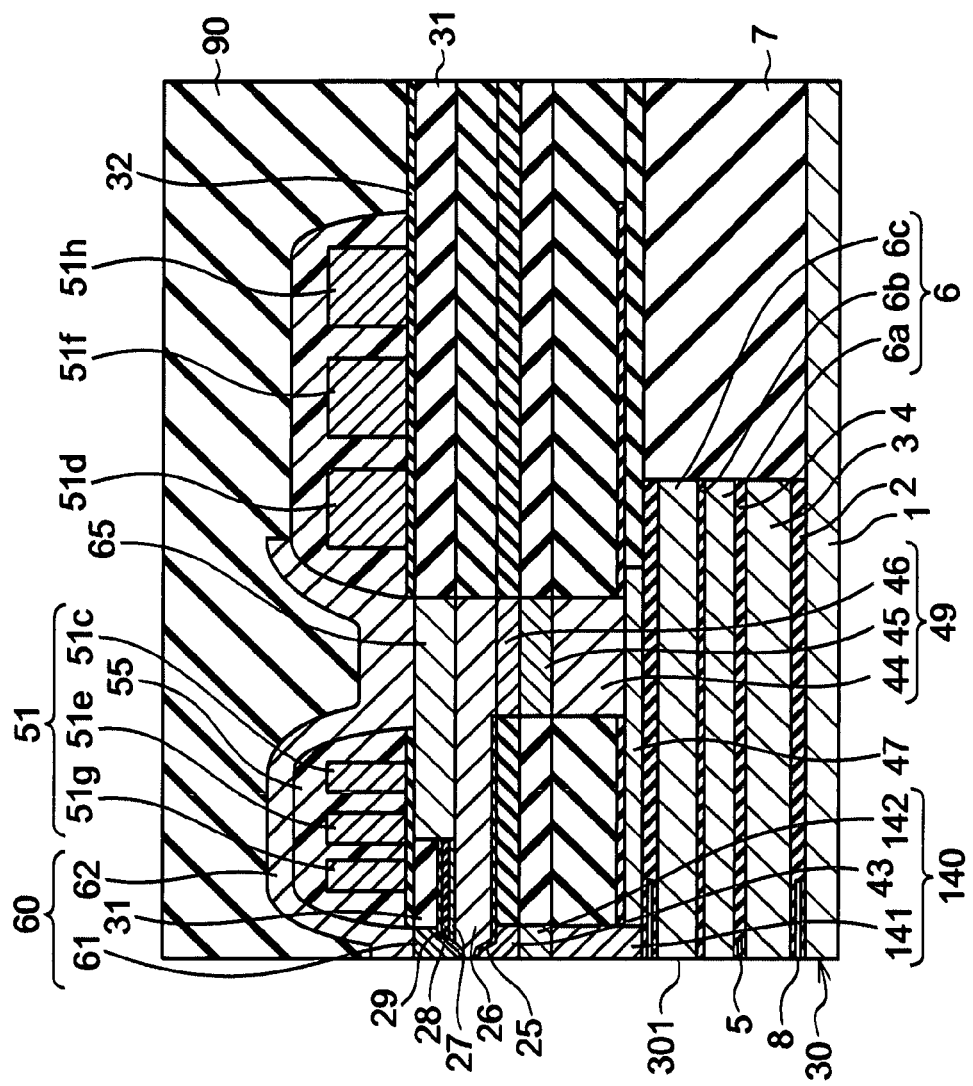
FIG. 19 is a sectional view of the thin-film magnetic head according to a modified example corresponding to FIG. 1, along by a direction intersecting its air bearing surface.

Next, the thin-film magnetic head 301 will now be explained with reference to FIG. 19. The thin-film magnetic head 301 is different in that it has a connecting magnetic layer 140 in place of the connecting magnetic layer 40, as compared with the thin-film magnetic head 300.

The connecting magnetic layer 140 has a opposing connecting part 141 and a middle connecting part 142, in place of the receding connecting part 41 and the middle connecting part 42.

The opposing connecting part 141 has an end face disposed in the ABS 30, and the side thereof opposite to the end face is connected to the end part on the ABS 30 side of the return magnetic pole layer 47. Further, the opposing connecting part 141 has an upper face connected to the middle connecting part 142, and the upper face is formed flat without level difference to the upper face of the first linking magnetic part 44. The middle connecting part 142 is connected to the opposing connecting part 141 and the front end shield part 43. Further, the middle connecting part 142 is smaller in width than the middle connecting part 42.

In such a thin-film magnetic head 301, the connecting magnetic layer 140 has the front end shield part 43 and is thus connected to the write shield layer 60. Further, the connecting magnetic layer 140 is also connected to the return magnetic pole layer 47. Therefore, as in the thin-film magnetic head 300, the magnetic flux that the direction is different from the magnetic flux WH among the magnetic fluxes emitted from the main magnetic pole layer 26 is divided into two flows of the magnetic flux H1 and the magnetic flux H2 and then taken in by the write shield layer 60 and the connecting magnetic layer 140. The magnetic flux H2 functions, in the return magnetic pole layer 47, to weaken the magnetic function of the magnetic flux H1 and therefore substitutes for the backward magnetic flux generated by the backing coil. Therefore, in the thin-film magnetic head 301, excessive magnetic flux is hardly emitted from the return magnetic pole layer 47 toward the ABS 30 without the backing coil as in the thin-film magnetic head 300, so that the effect of improving WATE higher than that in the prior art can be achieved.

MODIFIED EXAMPLE 2

Figure 20:
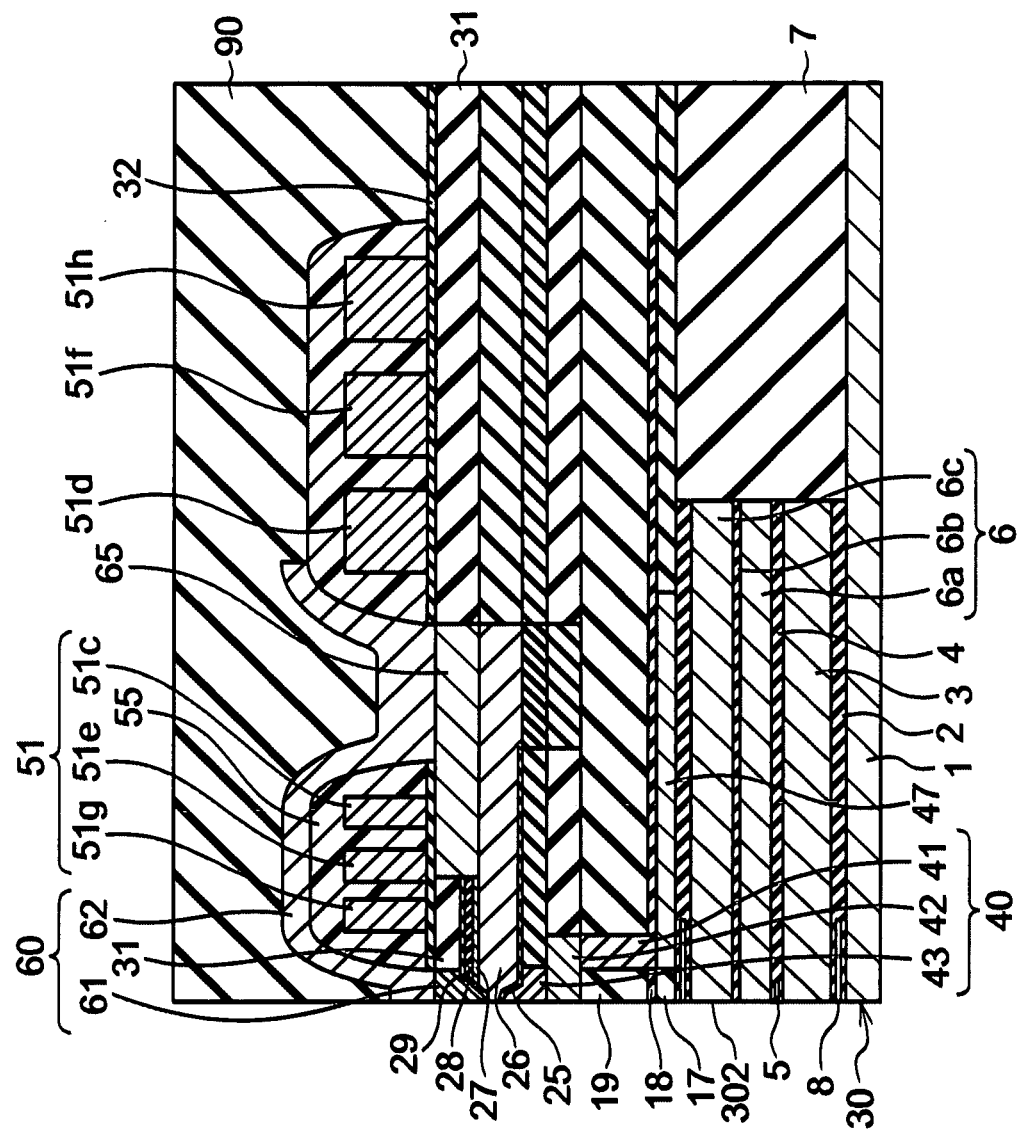
FIG. 20 is a sectional view of the thin-film magnetic head according to an another modified example corresponding to FIG. 1, along by a direction intersecting its air bearing surface.

Next, the thin-film magnetic head 302 will now be explained with reference to FIG. 20. This thin-film magnetic head 302 is different in that it does not have the linking magnetic layer 49, as compared with the above-described thin-film magnetic head 300.

In the thin-film magnetic head 302, the return magnetic pole layer 47 is formed at a position distanced from the ABS 30 and the front end insulating layer 17 is formed on the ABS 30 side of the return magnetic pole layer 47 as in the thin-film magnetic head 300, so that the magnetic flux is hardly emitted from the return magnetic pole layer 47 to the ABS 30.

Further, since the thin-film magnetic head 302 has the connecting magnetic layer 40, also in the thin-film magnetic head 302, the magnetic flux that the direction is different from the magnetic flux WH among the magnetic fluxes emitted from the main magnetic pole layer 26 is divided into two flows of the magnetic flux H1 and the magnetic flux H2 and then taken in by the write shield layer 60 and the connecting magnetic layer 40 as in the thin-film magnetic head 300.

Therefore, also in the thin-film magnetic head 302, excessive magnetic flux is hardly emitted from the return magnetic pole layer 47 toward the ABS 30 as in the thin-film magnetic head 300, so that the effect of improving WATE higher than that in the prior art can be achieved without the backing coil.

EXAMPLES

Figure 21:
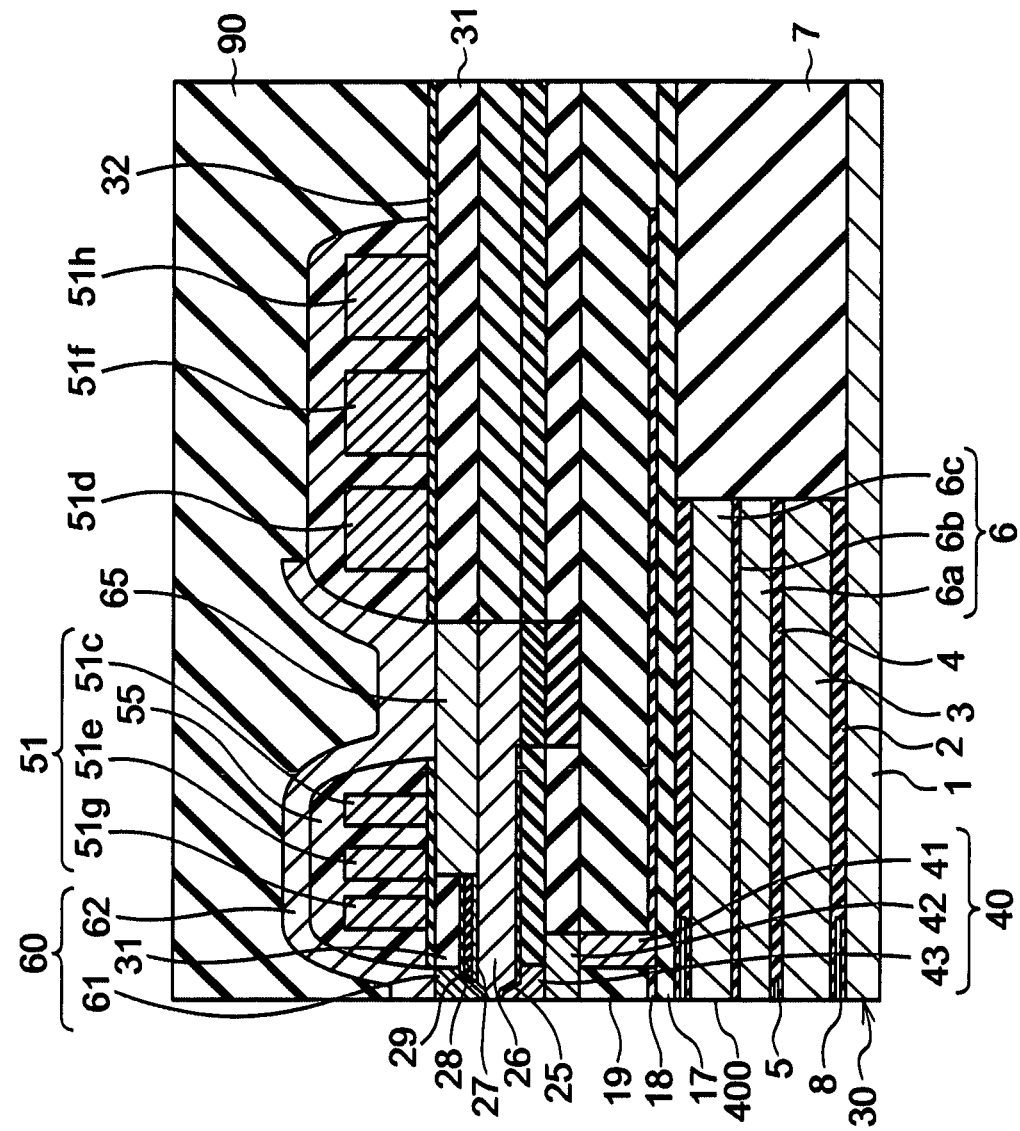
FIG. 21 is a sectional view of the thin-film magnetic head relating to the present invention, corresponding to FIG. 1, along by a direction intersecting its air bearing surface.

Examples relating to the effect of improving WATE in the above-described thin-film magnetic heads 300, 301, 302 will be described with reference to FIG. 22 to FIG. 23. The present inventors conducted experiments for confirming the effect of improving WATE for the thin-film magnetic heads 300, 301, 302 respectively. Further, for comparison, the same experiment on the thin-film magnetic heads 300, 301, 302 was also conducted on a thin-film magnetic head 400 illustrated in FIG. 21. The thin-film magnetic head 400 is different compared to the thin-film magnetic head 300 in that the return magnetic pole layer 47 and the linking magnetic layer 49 are not provided as illustrated in FIG. 21.

Figure 22:
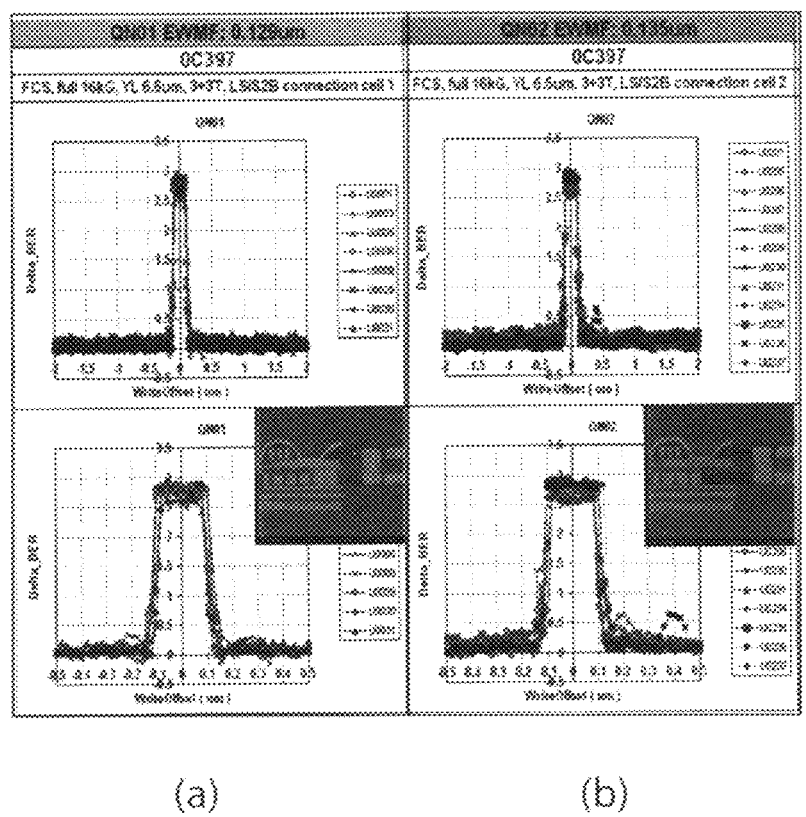
FIG. 22 is a graph illustrating a distribution of bite error rate according to an offset from sector being recording target, in which (a) is the thin-film magnetic head illustrated in FIG. 1, in which (b) is the thin-film magnetic head illustrated in FIG. 20.
Figure 23:
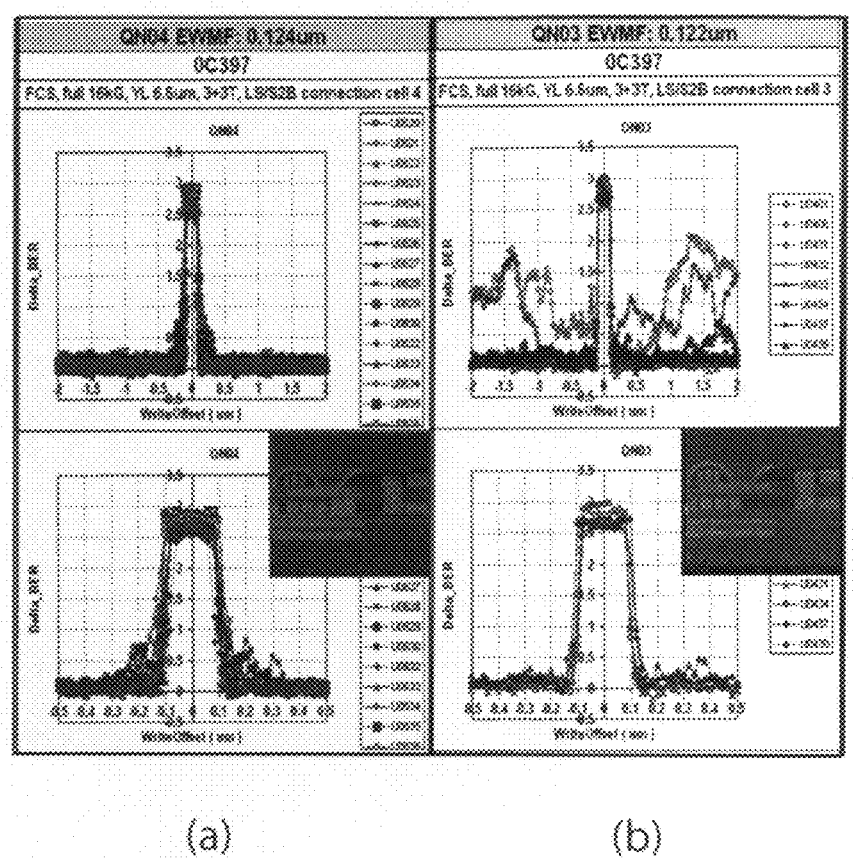
FIG. 23 is a graph illustrating a distribution of bite error rate according to an offset from sector being recording target, in which (a) is the thin-film magnetic head illustrated in FIG. 19, in which (b) is the thin-film magnetic head illustrated in FIG. 21.

FIG. 22, FIG. 23 are graphs each illustrating the distribution of bit error rate for each write offset from the sector that is the recording target. The bit error rate indicates the rate of error reproduction when data recorded by each of the thin-film magnetic heads 300, 301, 302 is reproduced by the respective reproducing head.

In FIG. 22, (a), (b) indicates the distribution of the bit error rate in each of the thin-film magnetic heads 300, 302. In FIG. 23, (a), (b) indicates the distribution of the bit error rate in each of the thin-film magnetic heads 301, 400. Further, in each drawing, the graph on the upper stage indicates the distribution of the write offset from 0 to 2 µm in increments of 0.5 µm. The graph on the lower stage indicates the distribution of the write offset from 0 to 0.5 µm in increments of 0.1 µm.

As illustrated at the lower stages in FIG. 22, FIG. 23, all of the distributions of the write offsets in the thin-film magnetic heads 300, 301, 302, 400 are substantially the same from 0 to 0.5 µm. However, as illustrated at the upper stage in FIG. 23(b), the occurrence frequency in the bit error rate increases when the write offset reaches about 1 µm, 2 µm beyond 0.5 µm.

In contrast, as illustrated on the upper stages in FIG. 22(a), (b) and the upper stage in FIG. 23(a), the occurrence frequency in the bit error rate does not increase but is still low even when the write offset reaches about 1 µm, 2 µm beyond 0.5 µm in the thin-film magnetic head 300, 301, 302. From this result, it becomes clear that the structure like the thin-film magnetic head 300, 301, 302 can achieve the effect of improving WATE higher than that in the prior art.

(Embodiments of Head Gimbal Assembly and Hard Disk Drive)

Next, embodiments of the head gimbal assembly and hard disk drive will now be explained with reference to FIG. 24 to FIG. 25.

Figure 24:
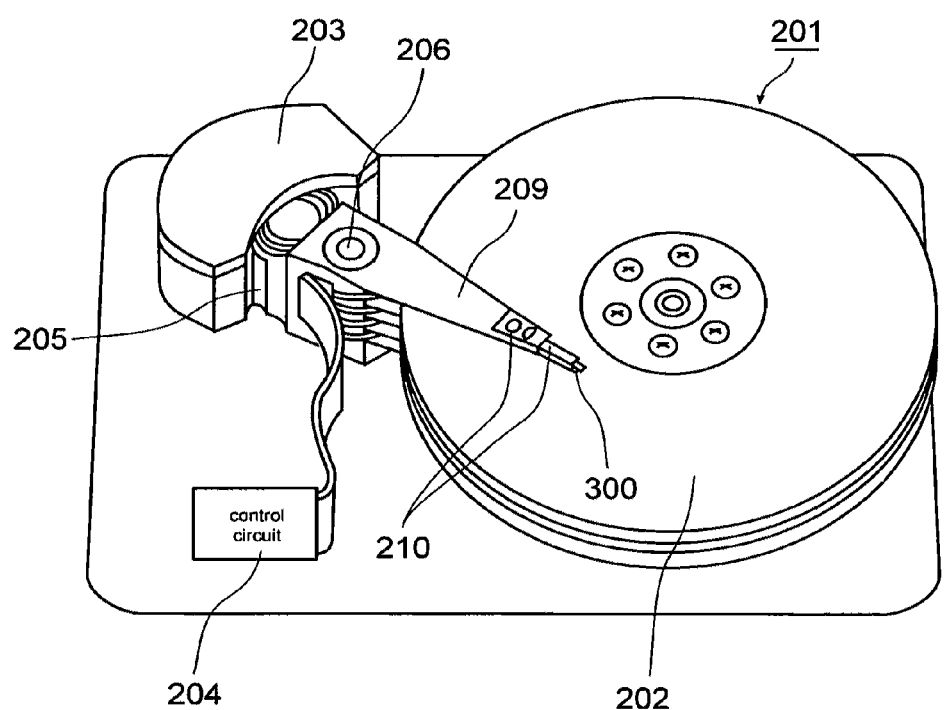
FIG. 24 is a perspective view illustrating a hard disk drive equipped with a thin-film magnetic head according to an embodiment of the present invention.

FIG. 24 is a perspective view illustrating a hard disk drive 201 equipped with the above-mentioned thin-film magnetic head 300. FIG. 25 is a perspective view illustrating a rear side of HGA 210. As illustrated in FIG. 24, the hard disk drive 201 includes a hard disk (magnetic recording medium) 202 rotating at a high speed and a head gimbal assembly (HGA) 210. The hard disk drive 201 is an apparatus which actuates the HGA 210, so as to record/reproduce data onto/from recording surfaces of the hard disk 202. The hard disk 202 has a plurality of (4 in the drawing) platters. Each platter has a recording surface opposing its corresponding thin-film magnetic head 300.

Figure 25:
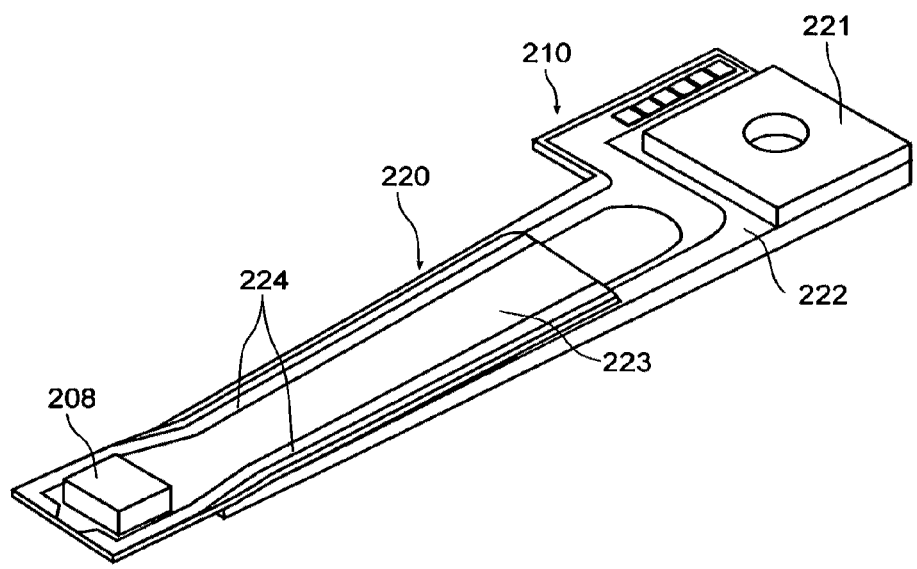
FIG. 25 is a perspective view illustrating a rear side of HGA.
Figure 26:
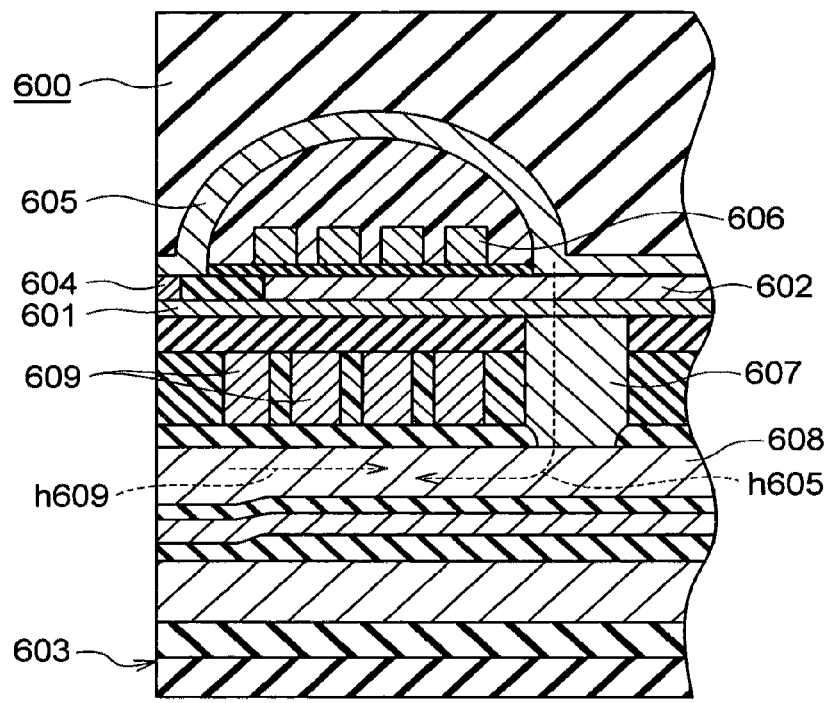
FIG. 26 is a sectional view illustrating an example of a conventional thin-film magnetic head.

The hard disk drive 201 positions a slider 208 illustrated in FIG. 25 on a track by an assembly carriage device 203. The thin-film magnetic head 300 is formed on this slider 208. Further, the hard disk drive 201 has a plurality of drive arms 209. The drive arms pivot about a pivot bearing shaft 206 by means of a voice coil motor (VCM) 205, and are stacked in a direction along the pivot bearing shaft 206. Further, an HGA 210 is attached to the tip of each drive arm.

Further, the hard disk drive 201 has a control circuit 204 controlling recording/reproducing.

The HGA 210 will now be described with reference to FIG. 25. In the HGA 210, the slider 208 is fixed to a tip portion of a suspension 220. Further, in the HGA 210, one end portion of a wiring member 224 is electrically connected to a terminal electrode of the slider 208.

The suspension 220 has a load beam 222, a base plate 221 provided at a base portion of the load beam 222, a flexure 223 fixed to and supported on the load beam 222 from the tip end side to the front side of the base plate 221 and having elasticity, and the wiring member 224. The wiring member 224 has a lead conductor and connection pads electrically connected to both ends of the lead conductor.

In the hard disk drive 201, when the HGA 210 is rotated, the slider 208 moves in a radial direction of the hard disk 202, i.e., a direction traversing track lines.

Such HGA 210 and hard disk drive 201 have the thin-film magnetic head 300, so that the effect of improving WATE higher than that in the prior art can be achieved without the backing coil.

This invention is not limited to the foregoing embodiments but various changes and modifications of its components may be made without departing from the scope of the present invention. Besides, it is clear that various embodiments and modified examples of the present invention can be carried out on the basis of the foregoing explanation. Therefore, the present invention can be carried out in modes other than the above-mentioned best modes within the scope equivalent to the following claims.

What is claimed is:

1. A thin-film magnetic head constructed such that a main magnetic pole layer having a magnetic pole end face on a side of a medium-opposing surface opposing a recording medium, a write shield layer having a write shield end face disposed in the medium-opposing surface, a gap layer formed between the main magnetic pole layer and write shield layer, and a thin-film coil are laminated on a substrate, the thin-film magnetic head comprising:
   a return magnetic pole layer formed at a position distanced from the medium-opposing surface on the side opposite to the write shield layer with the main magnetic pole layer intervening therebetween; and
   a connecting magnetic layer formed using a magnetic material so as to connect the return magnetic pole layer to the write shield layer on the side closer to the medium-opposing surface than the thin-film coil, wherein the connecting magnetic layer has a front end shield part and a middle connecting part, and wherein an upper surface of the middle connecting part extends further from the medium-opposing surface than a lower surface of the front end shield part,
   wherein the thin-film coil is wound to form a flat spiral structure around the write shield layer, the thin-film coil defining a structure such that the flat spiral structure is entirely disposed at an opposite side of the main magnetic pole layer from the substrate,
   wherein the front end shield part comprises a shield end face connected to the write shield end face in the medium-opposing surface,
   wherein the write shield end face and the shield end face surround the entire magnetic pole end face and are disposed near the magnetic pole end face; and
   wherein the connecting magnetic layer includes a receding connecting part disposed at a position distanced from the medium-opposing surface and connected to an upper face on the main magnetic pole layer side of the return magnetic pole layer, and the middle connecting part disposed in the medium-opposing surface, and connecting the front end shield part and the receding connecting part.

2. The thin-film magnetic head according to claim 1, further comprising:
a linking magnetic layer linking together the return magnetic pole layer and the main magnetic pole layer at a position distant from the medium-opposing surface,
wherein a magnetic circuit extending from the connecting magnetic layer and reaching the main magnetic pole layer through the return magnetic pole layer and the linking magnetic layer and having no coil wound therein is formed.

3. The thin-film magnetic head according to claim 1, wherein the middle connecting part has a middle shield end face disposed in the medium-opposing surface, and connected to the shield end face of the front end shield part in the medium-opposing surface and is connected to an upper face on the main magnetic pole layer side of the receding connecting part.

4. The thin-film magnetic head according to claim 1, wherein the middle connecting part has a depth extending from the medium-opposing surface and reaching a rear end part most distanced from the medium-opposing surface of the receding connecting part.

5. The thin-film magnetic head according to claim 1, further comprising:
an opposing insulating layer arranged on the medium-opposing surface side of the receding connecting part.

6. The thin-film magnetic head according to claim 1, wherein the front end shield part has a v-groove part formed in a v-shape in cross section in the direction along the medium-opposing surface, and
wherein the thin-film magnetic head further comprises a nonmagnetic thin-film formed on an inner face inside the v-groove part, and the main magnetic pole layer is formed on the nonmagnetic thin-film.

7. The thin-film magnetic head according to claim 1, further comprising an upper yoke layer, wherein the write shield layer includes an opposing shield part and a cover shield part connected thereto, the opposing shield part defining the write shield end face, the cover shield part defining a curved structure that straddles the thin-film coil and a portion connected to the upper yoke layer, the cover shield part defining an end face that is connected to the write shield end face.

8. The thin-film magnetic head according to claim 1, wherein rear facing surfaces of the receding connecting part and of the middle connecting part are aligned.

9. The thin-film magnetic head according to claim 1, wherein the thin-film magnetic head does not have a coil part disposed at a substrate side closer to the substrate than the main magnetic pole layer.

10. The thin-film magnetic head according to claim 1, wherein a rear side part of the connecting magnetic layer is embedded with an insulating part without having a conductive part, and the insulating part is in contact with a side surface of the connecting magnetic layer.

11. A head gimbal assembly comprising a thin-film magnetic head formed on a support and a gimbal for securing the support;
wherein the thin-film magnetic head is constructed such that a main magnetic pole layer having a magnetic pole end face on a side of a medium-opposing surface opposing a recording medium, a write shield layer having a write shield end face disposed in the medium-opposing surface, a gap layer formed between the main magnetic pole layer and write shield layer, and a thin-film coil are laminated on a substrate; the thin-film magnetic head comprising:
a return magnetic pole layer formed at a position distanced from the medium-opposing surface on the side opposite to the write shield layer with the main magnetic pole layer intervening therebetween; and
a connecting magnetic layer formed using a magnetic material so as to connect the return magnetic pole layer to the write shield layer on the side closer to the medium-opposing surface than the thin-film coil, wherein the connecting magnetic layer has a front end shield part and a middle connecting part, and wherein an upper surface of the middle connecting part extends further from the medium-opposing surface than a lower surface of the front end shield part,
wherein the thin-film coil is wound to form a flat spiral structure around the write shield layer, the thin-film coil defining a structure such that the flat spiral structure is entirely disposed at an opposite side of the main magnetic pole layer from the substrate,
wherein the front end shield part comprises a shield end face connected to the write shield end face in the medium-opposing surface,
wherein the write shield end face and the shield end face surround the entire magnetic pole end face and are disposed near the magnetic pole end face; and
wherein the connecting magnetic layer includes a receding connecting part disposed at a position distanced from the medium-opposing surface and connected to an upper face on the main magnetic pole layer side of the return magnetic pole layer, and the middle connecting part disposed in the medium-opposing surface, and connecting the front end shield part and the receding connecting part.

12. A hard disk drive comprising a head gimbal assembly having a thin-film magnetic head and a recording medium opposing the thin-film magnetic head;
wherein the thin-film magnetic head is constructed such that a main magnetic pole layer having a magnetic pole end face on a side of a medium-opposing surface opposing a recording medium, a write shield layer having a write shield end face disposed in the medium-opposing surface, a gap layer formed between the main magnetic pole layer and write shield layer, and a thin-film coil are laminated on a substrate; the thin-film magnetic head comprising:
a return magnetic pole layer formed at a position distanced from the medium-opposing surface on the side opposite to the write shield layer with the main magnetic pole layer intervening therebetween; and
a connecting magnetic layer formed using a magnetic material so as to connect the return magnetic pole layer to the write shield layer on the side closer to the medium-opposing surface than the thin-film coil, wherein the connecting magnetic layer has a front end shield part and a middle connecting part, and wherein an upper surface of the middle connecting part extends further from the medium-opposing surface than a lower surface of the front end shield part,
wherein the thin-film coil is wound to form a flat spiral structure around the write shield layer, the thin-film coil defining a structure such that the flat spiral structure is entirely disposed at an opposite side of the main magnetic pole layer from the substrate,
wherein the front end shield part comprises a shield end face connected to the write shield end face in the medium-opposing surface, wherein the write shield end face and the shield end face surround the entire magnetic pole end face and are disposed near the magnetic pole end face; and wherein the connecting magnetic layer includes a receding connecting part disposed at a position distanced from the medium-opposing surface and connected to an upper face on the main magnetic pole layer side of the return magnetic pole layer, and the middle connecting part disposed in the medium-opposing surface, and connecting the front end shield part and the receding connecting part.

* * * * *

UNITED STATES PATENT AND TRADEMARK OFFICE
CERTIFICATE OF CORRECTION

| | |
|---|---|
| PATENT NO. | : 8,824,102 B2 |
| APPLICATION NO. | : 13/099729 |
| DATED | : September 2, 2014 |
| INVENTOR(S) | : Yoshitaka Sasaki et al. |

It is certified that error appears in the above-identified patent and that said Letters Patent is hereby corrected as shown below:

On the Title Page:

In the Assignees line; the Second Assignee item (73); delete "Sae Magnetics (H.K.) Ltd." and insert --SAE Magnetics (H.K.) Ltd.--, therefor.

Signed and Sealed this
Sixteenth Day of December, 2014

Michelle K. Lee
*Deputy Director of the United States Patent and Trademark Office*